(12) United States Patent
Urushihara et al.

(10) Patent No.: US 8,600,195 B2
(45) Date of Patent: Dec. 3, 2013

(54) IMAGE PROCESSING DEVICE, METHOD AND PROGRAM

(75) Inventors: Minoru Urushihara, Tokyo (JP); Masato Usuki, Kanagawa (JP); Takayuki Ohe, Saitama (JP); Kenkichi Kobayashi, Tokyo (JP); Koji Moriya, Chiba (JP)

(73) Assignee: Sony Corporation (JP)

( * ) Notice: Subject to any disclaimer, the term of this patent is extended or adjusted under 35 U.S.C. 154(b) by 1069 days.

(21) Appl. No.: 12/151,135

(22) Filed: May 2, 2008

(65) Prior Publication Data

US 2009/0087125 A1    Apr. 2, 2009

(30) Foreign Application Priority Data

May 16, 2007    (JP) ................ P2007-130524

(51) Int. Cl.
*G06T 3/40* (2006.01)
(52) U.S. Cl.
USPC ........... 382/298; 382/299; 382/300; 345/629; 348/561
(58) Field of Classification Search
CPC ........... G06T 3/40; H04N 5/2628; G09G 5/15
USPC .................. 382/298–300; 345/698–699, 629; 348/561
See application file for complete search history.

(56) References Cited

U.S. PATENT DOCUMENTS

| | | | | |
|---|---|---|---|---|
| 6,967,687 B1 * | 11/2005 | Suga | ............... | 348/441 |
| 7,006,156 B2 * | 2/2006 | Hirase et al. | .................. | 348/600 |
| 7,564,902 B2 * | 7/2009 | Sasai et al. | ............... | 375/240.26 |
| 8,115,867 B2 * | 2/2012 | Miyauchi et al. | ............. | 348/452 |
| 2003/0218692 A1 * | 11/2003 | Kaida et al. | .................... | 348/448 |
| 2004/0085480 A1 * | 5/2004 | Salzer et al. | .................. | 348/584 |
| 2008/0181312 A1 * | 7/2008 | Kimura | .................... | 375/240.27 |
| 2009/0059068 A1 * | 3/2009 | Hanaoka et al. | ............. | 348/459 |
| 2010/0053428 A1 * | 3/2010 | Ohe et al. | ...................... | 348/452 |

FOREIGN PATENT DOCUMENTS

| | | |
|---|---|---|
| JP | 11069382 A | 3/1999 |
| JP | 2001-042831 A | 2/2001 |
| JP | 2004-120757 A | 4/2004 |

(Continued)

OTHER PUBLICATIONS

Ojo et al., "Robust Motion-Compensated Video Upconversion", IEEE Transactions on Consumer Electronics, vol. 43 No. 4, Nov. 1997, pp. 1045-1056.*

(Continued)

*Primary Examiner* — Matthew Bella
*Assistant Examiner* — Jose M Torres
(74) *Attorney, Agent, or Firm* — Lerner, David, Littenberg, Krumholz & Mentlik, LLP

(57) ABSTRACT

An image processing device may include detection means for detecting a motion vector of an input image signal which is an input time-series image signal; interpolation means for interpolating, based on the motion vector, a signal between input image signals which is an image signal at an arbitrary time between the input image signal and a previous input image signal immediately preceding the input image signal, the interpolation means for further outputting an interpolated signal; acquisition means for acquiring superimposition information which indicates the position, in the input image signal, of a predetermined image signal to be superimposed on the input image signal; and specification means for specifying, based on the superimposition information, at least one non-interpolation region of the signal between input image signals in which the interpolation is not performed.

18 Claims, 13 Drawing Sheets

(56) References Cited

FOREIGN PATENT DOCUMENTS

| | | | |
|---|---|---|---|
| JP | 2006197192 A | 7/2006 | |
| JP | 2006348385 A | 12/2006 | |
| JP | 2006352246 A | 12/2006 | |
| WO | 2007040045 A1 | 4/2007 | |

OTHER PUBLICATIONS

Office Action from Japanese Application No. 2007-130524, dated Jan. 24, 2012.

* cited by examiner

IMAGE PROCESSING DEVICE, METHOD AND PROGRAM

CROSS-REFERENCE TO RELATED APPLICATIONS

The present application claims priority from Japanese Patent Application No. JP 2007-130524 filed in the Japanese Patent Office on May 16, 2007, the entire content of which is incorporated herein by reference.

BACKGROUND OF THE INVENTION

1. Field of the Invention

The present invention relates to an image processing device, method and program, and more particularly to an image processing device, method and program capable of providing improved image quality of an interpolated image signal when a predetermined image signal is superimposed on a pre-interpolation image signal.

2. Description of the Related Art

Frame interpolation designed to interpolate the image signal between frames is an important process for providing improved quality of the image signal. This process is applied, for example, to high frame rate image processing adapted to speed up the frame rate of an image signal and motion compensated image processing adapted to compensate for a motion of an image signal.

Among such interpolation techniques available today is one which obtains a motion vector of an input time-series image signal and interpolates the image signal at an arbitrary time between time-series image signals using the motion vector (e.g., Japanese Patent Laid-Open No. 2001-42831).

Incidentally, if an image signal containing an OSD (On Screen Display) image such as channel number or menu (hereinafter referred to as the "OSD image signal") is superimposed on an input time-series image signal, the OSD image signal is treated as an image signal as with the time-series image signal in the frame interpolation. However, the OSD image motion is generally irrelevant to the motion of the background image. Therefore, if the background image appears through the OSD image in particular, the OSD image motion is treated as part of the background motion. This may result in interpolation error of the OSD image in the frame interpolation using a motion vector.

In the frame interpolation using a motion vector, therefore, a possible solution under consideration is to pause the interpolation using a motion vector if an OSD image signal is superimposed on an input time-series image signal.

SUMMARY OF THE INVENTION

In this case, however, the interpolation of the background image other than the OSD image using a motion vector is also paused, thus resulting in a less-than-high-quality image after the frame interpolation.

In light of the foregoing, it may be desirable to provide improved image quality of an interpolated image signal when a predetermined image signal is superimposed on a pre-interpolation image signal.

An image processing device according to an embodiment of the present invention may include detection means for detecting a motion vector of an input image signal which is an input time-series image signal. The image processing device may further include interpolation means for interpolating, based on the motion vector, a signal between input image signals and output an interpolated signal. The signal between input image signals may be an image signal at an arbitrary time between the input image signal and a previous input image signal immediately preceding the input image signal. The image processing device may still further include acquisition means for acquiring superimposition information. The superimposition information may indicate the position, in the input image signal, of a predetermined image signal to be superimposed on the input image signal. The image processing device may still further include specification means for specifying, based on the superimposition information, at least one non-interpolation region of the signal between input image signals in which the interpolation is not performed. The interpolation means may interpolate, based on the specified non-interpolation region, the signal between input image signals in regions other than the non-interpolation region and output an interpolated signal.

In the image processing device according to another embodiment of the present invention, the specification means may specify, based on the superimposition information, at least one non-detection region of the input image signal in which the motion vector is not detected. The detection means may detect, based on the non-detection region, the motion vector of the input image signal in regions other than the non-detection region.

The image processing device according to still another of the present invention may further include superimposition means for superimposing the predetermined image signal on the input image signal.

In the image processing device according to still another embodiment of the present invention, the acquisition means and specification means may be connected to each other via a bus. Upon acquisition of superimposition information, the acquisition means may transmit the superimposition information to the specification means via the bus before the superimposition begins. Upon reception of the superimposition information from the acquisition means, the specification means may specify the non-interpolation region based on the superimposition information.

In the image processing device according to still another embodiment of the present invention, upon acquisition of the superimposition information, the acquisition means may put ports into a status representing the superimposition information before the superimposition begins. The specification means may confirm the status of the ports by polling before the superimposition begins so as to specify the non-interpolation region based on the superimposition information if the status of the ports represents the superimposition information.

An image processing method according to still another embodiment of the present invention is an image processing method for an image processing device which may be operable to interpolate a signal between input image signals. The signal between input image signals may be an image signal at an arbitrary time between an input image signal which is an input time-series image signal and a previous input image signal immediately preceding the input image signal. The image processing method may include a step of detecting a motion vector of the input image signal. The image processing method may further include a step of acquiring superimposition information. The superimposition information may indicate the position, in the input image signal, of a predetermined image signal to be superimposed on the input image signal. The image processing method may still further include a step of specifying, based on the superimposition information, at least one non-interpolation region of the signal between input image signals in which interpolation based on the motion vector is not performed. The image processing method may still further include a step of interpolating, based on the motion vector, the signal between input image signals in regions other than the non-interpolation region and outputting an interpolated signal.

A program according to still another embodiment of the present invention may cause a computer to perform interpolation adapted to interpolate a signal between input image signals. The signal between input image signals may be an image signal at an arbitrary time between an input image signal which is an input time-series image signal and a previous input image signal immediately preceding the input image signal. The program may include a step of detecting a motion vector of the input image signal. The program may further include a step of acquiring superimposition information. The superimposition information may indicate the position, in the input image signal, of a predetermined image signal to be superimposed on the input image signal. The program still further includes a step of specifying, based on the superimposition information, at least one non-interpolation region of the signal between input image signals in which interpolation based on the motion vector is not performed. The program may still further include a step of interpolating, based on the motion vector, the signal between input image signals in regions other than the non-interpolation region and outputting an interpolated signal.

According to still another embodiment of the present invention, a program may causes a computer to perform interpolation adapted to interpolate a signal between input image signals. The program may detect a motion vector of an input image signal which is an input time-series image signal. The program may still further acquire superimposition information. The superimposition information may indicate the position, in the input image signal, of a predetermined image signal to be superimposed on the input image signal. The program may still further specify, based on the superimposition information, at least one non-interpolation region of a signal between input image signals in which interpolation based on the motion vector is not performed. The signal between input image signals may be an image signal at an arbitrary time between an input image signal which is an input time-series image signal and a previous input image signal immediately preceding the input image signal. The program may still further interpolate, based on the motion vector, the signal between input image signals in regions other than the non-interpolation region and output an interpolated signal.

As described above, one embodiment of the present invention may provide improved image quality of an interpolated image signal when a predetermined image signal is superimposed on a pre-interpolation image signal.

DETAILED DESCRIPTION

Figure 1:
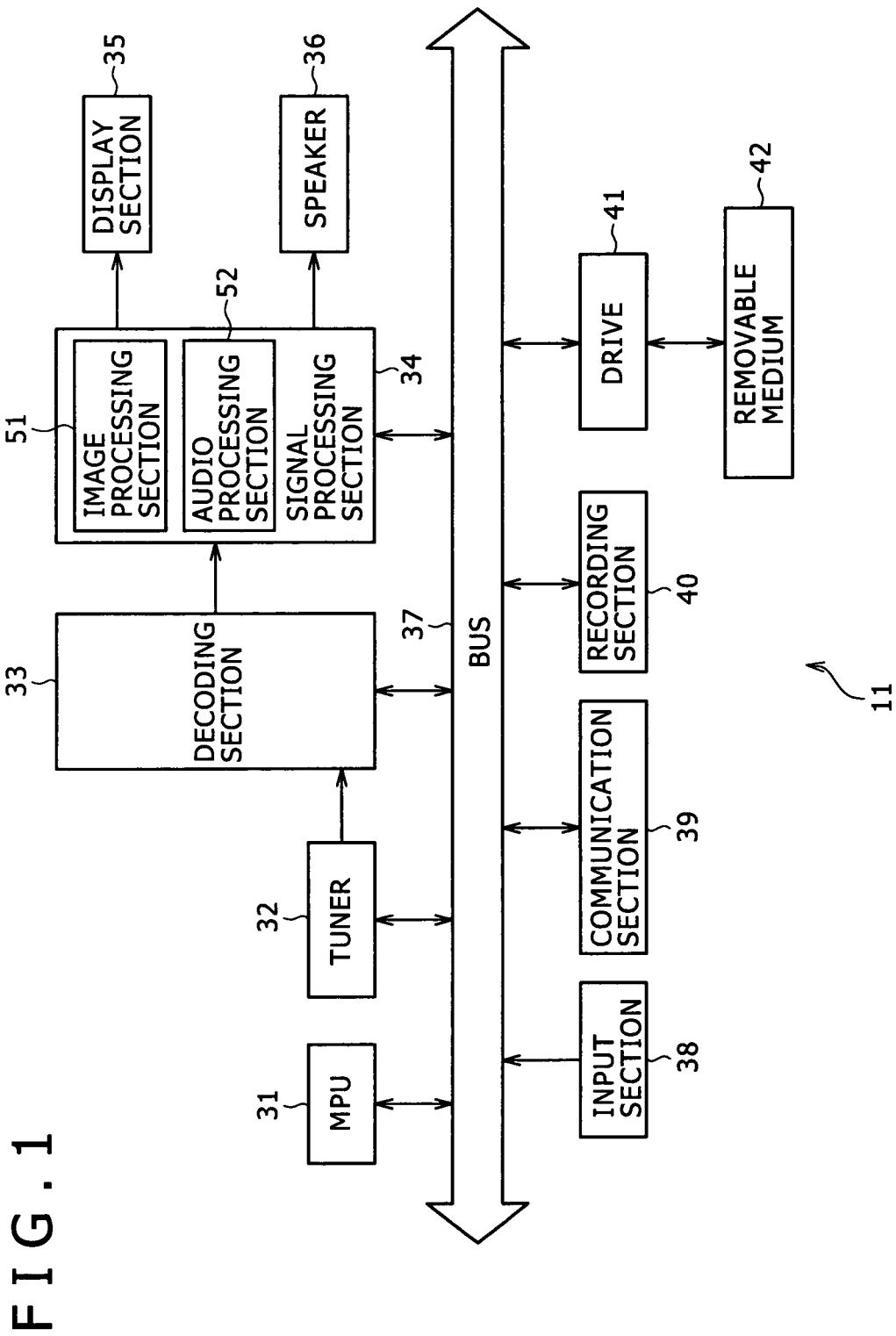
FIG. 1 is a block diagram illustrating a first embodiment of a receiving device to which the present invention is applied.

The preferred embodiments of the present invention will be described below. The correspondence between the constituent elements as defined by the claims of the present invention and the embodiments in the specification or drawings is as follows. This description is intended to confirm that the embodiments supporting the invention are disclosed in the specification or drawings. Therefore, even if any embodiment disclosed in the specification or drawings is not stated herein as relating to a constituent element as defined by an appended claim, it does not means that the embodiment does not relate to the constituent element. On the contrary, even if an embodiment is disclosed herein as relating to a constituent element as defined by an appended claim, it does not mean that the embodiment does not relate to any other constituent element.

An image processing device according to an embodiment of the present invention (e.g., receiving device 11 in FIG. 1) includes detection means (e.g., detection section 82 in FIG. 3) adapted to detect a motion vector of an input image signal which is an input time-series image signal.

The image processing device further includes interpolation means (e.g., moving section 83 and mixing section 85 in FIG. 3) adapted to interpolate, based on the motion vector, a signal between input image signals and output an interpolated signal. The signal between input image signals is an image signal at an arbitrary time between the input image signal and a previous input image signal immediately preceding the input image signal.

The image processing device still further includes acquisition means (e.g., MPU 31 in FIG. 2) adapted to acquire superimposition information. The superimposition information indicates the position, in the input image signal, of a predetermined image signal to be superimposed on the input image signal.

The image processing device still further includes specification means (e.g., specification section 84 in FIG. 3) adapted to specify, based on the superimposition information, at least one non-interpolation region of the signal between input image signals in which the interpolation is not performed.

The interpolation means interpolate, based on the specified non-interpolation region, the signal between input image signals in regions other than the non-interpolation region and output an interpolated signal.

The image processing device according to another embodiment of the present invention further includes superimposition means (e.g., OSD superimposition section 71 in FIG. 2) adapted to superimpose the predetermined image signal on the input image signal.

Figure 2:
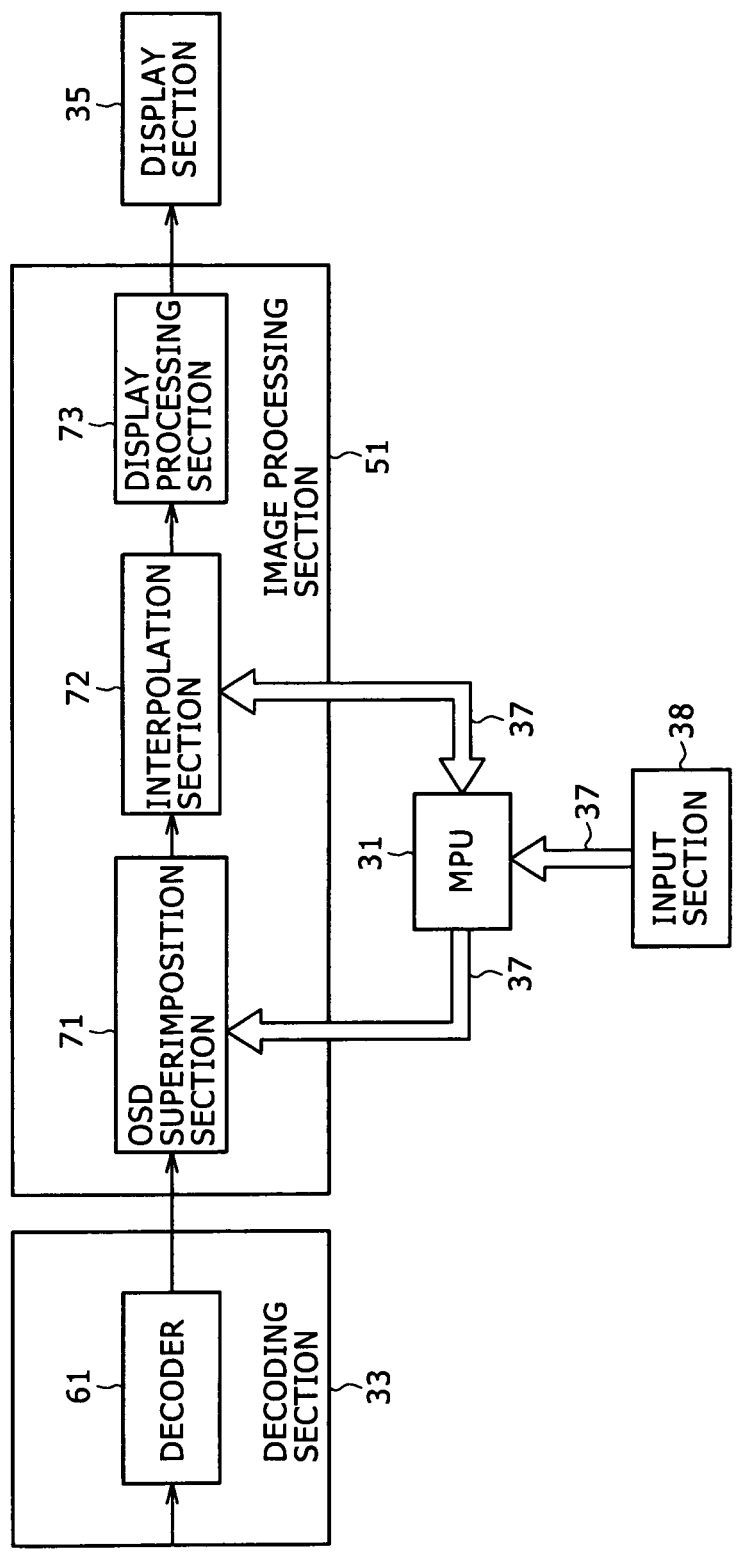
FIG. 2 is a block diagram describing interpolation performed by the receiving device shown in FIG. 1.

In the image processing device according to still another embodiment of the present invention, the acquisition means and specification means are connected to each other via a bus (e.g., bus 37 in FIG. 2). Upon acquisition of superimposition information, the acquisition means transmit the superimposition information to the specification means via the bus before the superimposition begins. Upon reception of the superimposition information from the acquisition means, the specification means specify the non-interpolation region based on the superimposition information.

In the image processing device according to still another embodiment of the present invention, upon acquisition of the superimposition information, the acquisition means put ports (e.g., ports 132A-3 to 132A-n in FIG. 9) into a status representing the superimposition information before the superimposition begins. The specification means confirm the status of the ports by polling before the superimposition begins. The specification means specify the non-interpolation region based on the superimposition information if the status of the ports represents the superimposition information.

An image processing method according to still another embodiment of the present invention is an image processing method for an image processing device (e.g., receiving device 11 in FIG. 1) operable to interpolate a signal between input image signals. The signal between input image signals is an image signal at an arbitrary time between an input image signal which is an input time-series image signal and a previous input image signal immediately preceding the input image signal. The image processing method includes a step of detecting a motion vector of the input image signal (e.g., step S153 in FIG. 6). The image processing method further includes a step of acquiring superimposition information (e.g., step S11 in FIG. 4). The superimposition information indicates the position, in the input image signal, of a predetermined image signal to be superimposed on the input image signal. The image processing method still further includes a step of specifying, based on the superimposition information, at least one non-interpolation region of the signal between input image signals in which interpolation based on the motion vector is not performed (e.g., step S156 in FIG. 6). The image processing method still further includes steps of interpolating, based on the motion vector, the signal between input image signals in regions other than the non-interpolation region and outputting an interpolated signal (e.g., steps S154, S158 and S159 in FIG. 6).

A detailed description will be given below of the specific embodiments to which the present invention is applied with reference to the accompanying drawings.

FIG. 1 illustrates a configuration example of a first embodiment of a receiving device to which the present invention is applied.

In a receiving device 11 shown in FIG. 1, the internal components thereof are connected to each other via a bus 37, namely, an MPU (Micro Processing Unit) 31, tuner 32, decoding section 33, signal processing section 34 having a display section 35 and speaker 36 connected thereto, input section 38, communication section 39, recording section 40 and drive 41. The receiving section 11 receives a radio wave carrying a time-series frame-by-frame image and audio digital signal of a program (hereinafter referred to as the "program signal") and outputs the image and audio of the program.

The MPU 31 executes the programs installed in the recording section 40, for example, to perform various processes in response to the instructions from the input section 38. For instance, in response to an instruction from the input section 38 adapted to display the program of the user's desired channel, the MPU 31 controls the tuner 32, decoding section 33 and signal processing section 34. By controlling these components, the MPU 31 causes the display section 35 to display the image associated with the program signal of the channel. The display section includes a liquid crystal panel or other device. At the same time, the MPU 31 causes the speaker 36 to produce an audio output.

Further, the MPU 31 controls the signal processing section 34 based on an OSD display instruction and at least one piece of OSD information. The OSD display instruction is used to start the display of the OSD image. The OSD information indicates the display position of the OSD image in the program image. By controlling the signal processing section 34, the MPU 31 superimposes an OSD image signal on the image signal of the program signal. The OSD information indicates, for example, the display start position, size and shape of the OSD image.

Still further, the MPU 31 installs the programs to the recording section 40 as necessary. These programs include those downloaded from the communication section 39, others recorded in a magnetic, optical or magneto-optical disk loaded in the drive 41, and yet others recorded in a removable medium 42 such as semiconductor memory.

The tuner 32 receives a radio wave carrying the program signal from an unshown broadcasting station and demodulates the radio wave under control of the MPU 31. The tuner 32 supplies the program signal obtained from the demodulation to the decoding section 33.

The decoding section 33 decodes the program signal (coded program signal) into a predetermined format such as MPEG2 (Moving Picture Experts Group phase 2) under control of the MPU 31 and supplies the program signal obtained from the decoding to the signal processing section 34.

The signal processing section 34 includes an image processing section 51 and audio processing section 52. The image processing section 51 performs various types of image processing on the image signal of the program signal from the decoding section 33. Such image processing includes superimposition of the OSD image signal, interpolation of the continuous image signal at an intermediate time and D/A (digital/analog) conversion. The same section 51 supplies the analog image signal obtained from the image processing to the display section 35 to display the image on the same section 35.

The audio processing section 52 performs processing on the audio signal of the program signal from the decoding section 33 including D/A conversion. The same section 52 supplies the analog audio signal obtained from the processing to the speaker 36 to output the audio externally.

The input section 38 includes, for example, a receiving section adapted to receive instructions from an unshown remote controller, buttons, keyboard, mouse and switches so as to accept user instructions. In response to a user instruction, the same section 38 supplies various instructions to the MPU 31 via the bus 37.

For example, in response to a user instruction to display the program of the user's desired channel, the input section 38 supplies the instruction to the MPU 31. Further, in response to a user instruction to start the display of the OSD image, the same section 38 supplies OSD information about the OSD image and an OSD display instruction to the MPU 31.

The communication section 39 exchanges various types of data with external equipment via an unshown network such as the Internet. For example, the same section 39 downloads a predetermined program from an unshown server via the network and supplies the program to the MPU 31. The recording section 40 records the program to be executed by the MPU 31 and various types of data as necessary.

The removable medium 42 is loaded in the drive 41 as necessary. The drive 41 drives the removable medium 42 to read the programs and data therefrom and supplies the programs and data to the MPU 31 via the bus 37.

The interpolation performed by the receiving device 11 shown in FIG. 1 will be described next with reference to FIG. 2.

As illustrated in FIG. 2, in response to the user instruction to start or pause the display of the OSD image, the input section 38 supplies an OSD display instruction and OSD information or an OSD undisplay instruction to terminate the display of the OSD image to the MPU 31 via the bus 37.

The MPU 31 communicates with the image processing section 51 through 12C (Inter-Integrated Circuit) or UART (Universal Asynchronous Receiver Transmitter) via the bus 37. For example, the MPU 31 transmits OSD information and an interpolation pause instruction to pause the interpolation to the image processing section 51. The MPU 31 does so in response to the OSD display instruction and OSD information from the input section 38. Then, the MPU 31 transmits a superimposition start instruction to the image processing section 51. The superimposition start instruction is adapted to start the superimposition of the OSD image signal.

Further, in response to the OSD undisplay instruction from the input section 38, the MPU 31 transmits an interpolation restart instruction to the image processing section 51. The interpolation restart instruction is adapted to restart the interpolation. Then, the MPU 31 transmits a superimposition pause instruction to the image processing section 51. The superimposition pause instruction is adapted to pause the superimposition of the OSD image signal.

As illustrated in FIG. 2, the decoding section 33 includes a decoder 61. The decoder 61 decodes the program signal from the tuner 32 shown in FIG. 1 and supplies the image signal obtained from the decoding (hereinafter referred to as the "input image signal") to the image processing section 51. It should be noted that the decoded audio signal obtained in this step is supplied to the audio processing section 52 shown in FIG. 1.

The image processing section 51 includes an OSD superimposition section 71, interpolation section 72 and display processing section 73. The OSD superimposition section 71 superimposes the OSD image signal stored in advance on the input image signal from the decoder 61 at the position based on the OSD information from the MPU 31. The same section 71 does so in response to a superimposition start instruction transmitted from the MPU 31 via the bus 37. The same section 71 supplies the input image signal superimposed with the OSD image signal to the interpolation section 72. Further, the OSD superimposition section 71 pauses the superimposition of the OSD image signal on the input image signal from the decoder 61 in response to a superimposition pause instruction transmitted from the MPU 31 via the bus 37. In this case, the same section 71 supplies the input image signal from the decoder 61 to the interpolation section 72 in an as-is form.

The interpolation section 72 interpolates, based on the motion vector, the input image signal from the OSD superimposition section 71 in regions other than the region associated with the OSD information from the MPU 31. The same section 72 does so in response to an interpolation pause instruction transmitted from the MPU 31 via the bus 37. Further, the same section 72 interpolates, based on the motion vector, the input image signal from the OSD superimposition section 71 in all regions. The same section 72 does so in response to an interpolation restart instruction transmitted from the MPU 31 via the bus 37. The same section 72 supplies the interpolated image signal to the display processing section 73.

The display processing section 73 converts the interpolated image signal from the interpolation section 72 into analog form. The same section 73 supplies the analog signal obtained from the D/A conversion to the display section 35 to display the image on the same section 35.

Figure 3:
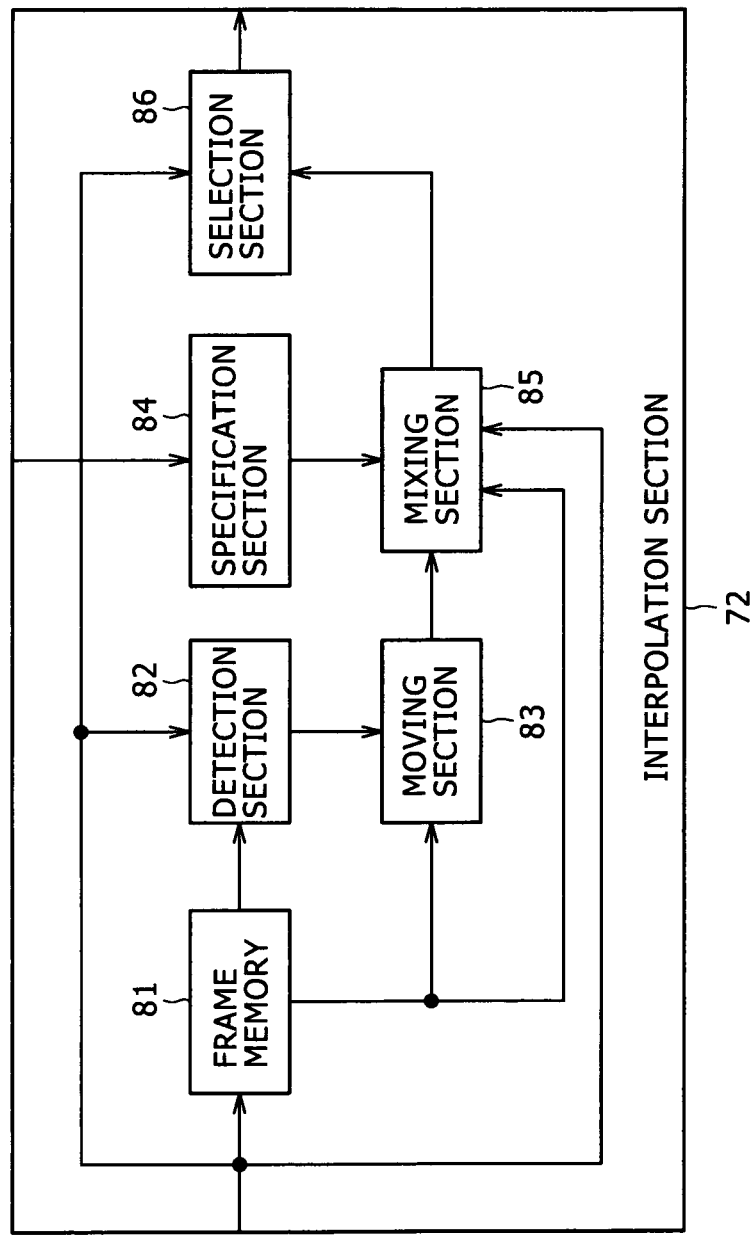
FIG. 3 is a block diagram illustrating a detailed configuration example of an interpolation section shown in FIG. 2.

FIG. 3 illustrates a detailed configuration example of the interpolation section 72 shown in FIG. 2.

The interpolation section 72 includes a frame memory 81, detection section 82, moving section 83, specification section 84, mixing section 85 and selection section 86.

The input image signal from the OSD superimposition section 71 shown in FIG. 2 is fed to the frame memory 81, detection section 82, mixing section 85 and selection section 86. On the other hand, an interpolation pause instruction and OSD information or an interpolation restart instruction from the MPU 31 via the bus 37 is supplied to the specification section 84.

The frame memory 81 stores the input image signal from the OSD superimposition section 71 on a frame-by-frame basis. The same memory 81 reads the previously stored input image signal, namely, the previous input image signal immediately preceding the input image signal fed from the OSD superimposition section 71 (hereinafter referred to as the "previous input image signal"), and supplies the signal to the detection section 82, moving section 83 and mixing section 85.

The detection section 82 treats the input image signal from the OSD superimposition section 71 as the input image signal to be detected (hereinafter referred to as the "target input image signal"). The same section 82 detects the motion vector of the target input image signal based on the target input image signal and previous input image signal immediately preceding the target input image signal.

For example, the detection section 82 matches the standard block which is set in the target input image signal against the reference block which is set in the previous input image signal to detect a block-by-block motion vector. The reference block is identical in size to the standard block. The detection section 82 supplies the block-by-block motion vector to the moving section 83.

The moving section 83 moves the previous input image signal from the frame memory 81 on a block-by-block basis using the block-by-block motion vector from the detection section 82. The same section 83 supplies the moved previous input image signal to the mixing section 85.

The specification section 84 specifies, based on the interpolation pause instruction and OSD information from the MPU 31, at least one non-interpolation region of an interpolation signal in which the interpolation based on the motion vector is not performed. The interpolation signal will be described later. Further, in response to the interpolation restart instruction from the MPU 31, the same section 84 specifies zero to indicate that there is no non-interpolation region. The same section supplies the non-interpolation region to the mixing section 85.

The mixing section 85 mixes the target input image signal from the OSD superimposition section 71 with the previous input image signal from the moving section 83 based on the non-interpolation region from the specification section 84. By doing so, the mixing section 85 generates an interpolation signal adapted to interpolate the image signal at an intermediate time between the target and previous input image signals.

More specifically, in order to generate an interpolation signal, the mixing section 85 mixes the target input image signal from the OSD superimposition section 71 with the previous input image signal from the moving section 83 in regions other than the non-interpolation region. In the non-interpolation region, on the other hand, the same section 85 uses the previous input image signal in an as-is form. That is, the same section 85 performs an interpolation by mixing the target input image signal with the previous input image signal that has been moved by the moving section 83 using a motion vector in regions other than the non-interpolation region. In the non-interpolation region, the same section 85 does not perform such an interpolation.

As a result, the interpolation signal is an image signal which is a mixture of the target input image signal and the previous input image signal in regions other than the non-interpolation region. In the non-interpolation region, the interpolation signal is the previous input image signal itself. The mixing section 85 supplies the interpolation signal to the selection section 86.

The selection section 86 selects the target input image signal from the OSD superimposition section 71 or interpolation signal from the mixing section 85. The same section 86 outputs the selected signal as the interpolated image signal at a predetermined timing. More specifically, the selection section 86 outputs, as the interpolated image signal, an interpolation signal generated using a target input image signal and next target input image signal. The selection section 86 outputs the interpolation signal between the target input image signal and next target input image signal. As a result, the interpolated image signal from the selection section 86 has a frame rate twice as high as the input image signal.

The OSD superimposition performed by the receiving device 11 shown in FIG. 1 will be described next with reference to FIG. 4. The OSD superimposition begins, for example, when an OSD display instruction and ODS information are supplied to the MPU 31 from the input section 38.

In step S11, the MPU 31 obtains an OSD display instruction and at least one piece of OSD information of the OSD image. The MPU 31 transmits one of these pieces of OSD information to the interpolation section 72 of the image processing section 51 via the bus 37. In step S21, the interpolation section 72 receives the OSD information from the MPU 31. In step S22, the same section 72 transmits a notice to the MPU 31 to the effect that the communication is complete.

In step S12, the MPU 31 receives the communication complete notice from the interpolation section 72. From here onward, the processes in steps S11 and S12 and in steps S21 and S22 will be similarly repeated as many times as the number of pieces of the OSD information supplied to the MPU 31 from the input section 38.

Then, in step S13, the MPU 31 transmits an interpolation pause instruction to the interpolation section 72. In step S23, the interpolation section 72 receives the interpolation pause instruction. Then, the same section 72 initiates, in response to the interpolation pause instruction, the pausing of the interpolation using a motion vector in the non-interpolation region.

In step S24, the interpolation section 72 transmits a notice to the MPU 31 to the effect that the communication of the interpolation pause instruction is complete. In step S14, the MPU 31 receives the notice. In step S15, the MPU 31 transmits a superimposition start instruction and all the OSD information obtained from the input section 38 to the OSD superimposition section 71 of the image processing section 51.

In step S31, the OSD superimposition section 71 receives the superimposition start instruction and the OSD information from the MPU 31. In response to the superimposition start instruction, the same section 71 initiates the superimposition of the OSD image signal on the input image signal from the decoder 61 at the position based on the OSD information.

As a result, the OSD image is displayed on the display section 35. From here onward, the processes in steps S11 to S15, in steps S21 to S24 and in step S31 will be similarly repeated until an OSD undisplay instruction is supplied to the MPU 31 from the input section 38. These processes will be repeated each time an OSD display instruction is supplied to the MPU 31 from the input section 38.

In step S16, the MPU 31 obtains an OSD undisplay instruction from the input section 38 via the bus 37. In response to the OSD undisplay instruction, the MPU 31 transmits a superimposition pause instruction to the OSD superimposition section 71. In step S32, the OSD superimposition section 71 receives the superimposition pause instruction from the MPU 31. In response to the superimposition pause instruction, the same section 71 pauses the superimposition of the OSD image signal on the input image signal. As a result, the OSD image appears on the display section 35 from the completion of step S31 by the OSD superimposition section 71 to the completion of step S32 by the same section 71.

In step S17, the MPU 31 transmits an interpolation restart instruction to the interpolation section 72. In step S25, the interpolation section 72 receives the interpolation restart instruction. In response to the interpolation restart instruction, the interpolation section 72 terminates the pausing of the interpolation using a motion vector in the non-interpolation region. That is, the interpolation section 72 initiates the interpolation using a motion vector in all regions. Therefore, the interpolation using a motion vector pauses from the completion of step S23 to the completion of step S25 in the non-interpolation region.

It should be noted that the period of time during which the interpolation using a motion vector pauses varies depending on factors including the processing speeds of the OSD superimposition and interpolation sections 71 and 72 and the communication speeds of the MPU 31 and interpolation section 72.

In step S26, the interpolation section 72 transmits a notice to the MPU 31 to the effect that the communication of the interpolation restart instruction is complete. In step S18, the MPU 31 receives the notice.

As described above, the MPU 31 transmits OSD information and an interpolation pause instruction to pause the interpolation using a motion vector in the non-interpolation region based on the OSD information. The MPU 31 does so before transmitting a superimposition start instruction. This provides improved image quality of the interpolated image signal. That is, the superimposition of the OSD image signal before the detection of a motion vector may lead to the detection of an abnormal motion vector in regions superimposed with the OSD image signal. Therefore, the receiving device 11 pauses the interpolation using a motion vector in the non-interpolation region based on OSD information prior to the superimposition start instruction, namely, prior to the superimposition of the OSD image signal. This prevents image disturbances found in regions superimposed with the OSD image signal, arising from interpolation using an abnormal motion vector, thus providing improved image quality of the interpolated image signal.

Further, interpolation using a motion vector is performed in regions other than the non-interpolation region. This provides improved image quality of the interpolated image signal as compared to the pausing of interpolation in all regions. Still further, the MPU 31 proceeds to a next process only after confirming the completion of the communication of OSD information and an interpolation pause instruction or an interpolation restart instruction. This ensures reliable control of the interpolation.

Figure 4:
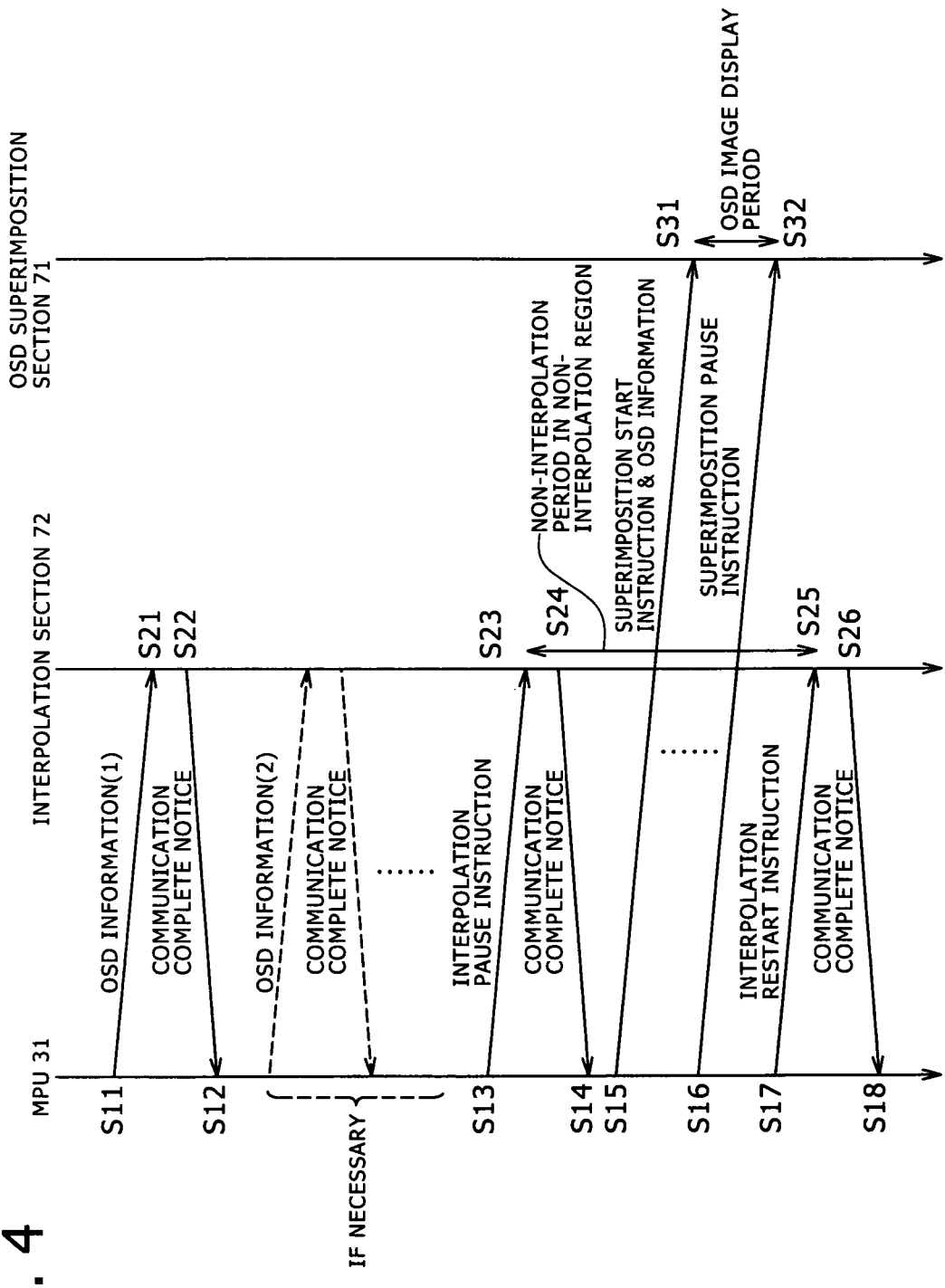
FIG. 4 is a flowchart describing OSD superimposition performed by the receiving device shown in FIG. 1.

In FIG. 4, the MPU 31 transmits a superimposition start instruction and OSD information to the OSD superimposition section 71 after transmitting OSD information and an interpolation pause instruction to the interpolation section 72. However, if the MPU 31 can transmit OSD information and an interpolation pause instruction to the interpolation section 72 before the OSD superimposition section 71 initiates the superposition in response to a superposition start instruction, the MPU 31 may transmit a superimposition start instruction and OSD information to the OSD superimposition section 71 before transmitting OSD information and an interpolation pause instruction to the interpolation section 72.

Figure 5:
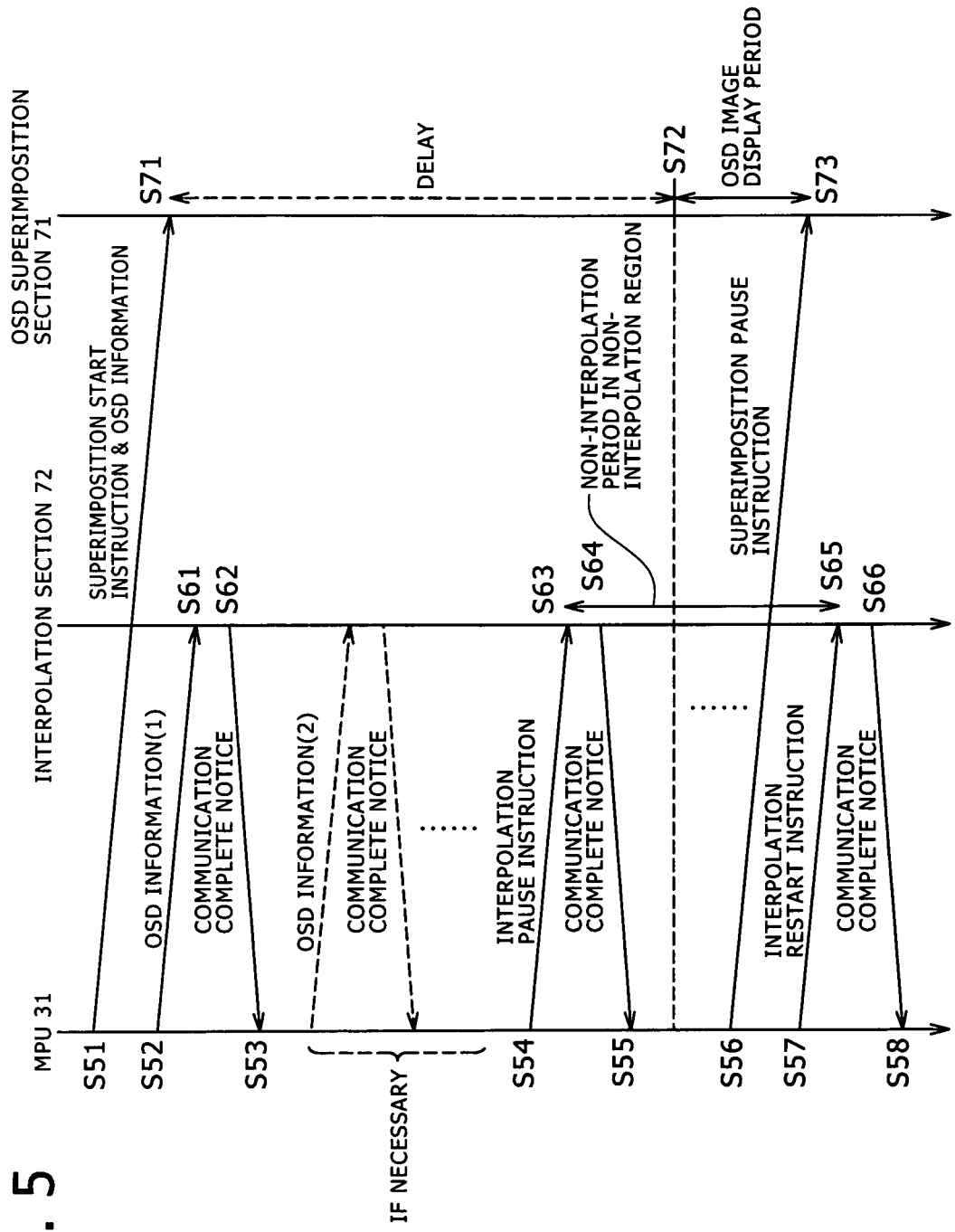
FIG. 5 is a flowchart describing other OSD superimposition performed by the receiving device shown in FIG. 1.

That is, in step S51 of FIG. 5, the MPU 31 obtains an OSD display instruction and at least one piece of OSD information of the OSD image and transmits an superimposition start instruction and OSD information to the OSD superimposition section 71 via the bus 37. In step S71, the OSD superimposition section 71 receives the superimposition start instruction and OSD information from the MPU 31 and delays the start of the superimposition until a predetermined period of time elapses.

The processes in steps S52 to S55 are the same as those in steps S11 to S14 in FIG. 4. The processes in steps S61 to S64 are the same as those in steps S21 to S24 in FIG. 4. Therefore, a description thereof will be omitted.

In step S55, the MPU 31 receives a notice to the effect that the communication of the interpolation pause instruction is complete. In the predetermined period of time after the MPU 31 has received the notice, the OSD superimposition section 71 initiates, in step S72, the superimposition of the OSD image signal on the input image signal from the decoder 61 at the position based on the OSD information received from the MPU 31 in step S71.

From here onward, the processes in steps S51 to S55, in steps S61 to S64 and in steps S71 and S72 will be repeated until an OSD undisplay instruction is supplied to the MPU 31 from the input section 38. These processes will be repeated each time an OSD display instruction is supplied to the MPU 31 from the input section 38. The process proceeds to step S56 when an OSD undisplay instruction is supplied to the MPU 31 from the input section 38.

The processes in steps S56 to S58 are the same as those in steps S16 to S18. The processes in steps S65 and S66 are the same as those in steps S25 and S26. The process in step S73 is the same as that in step S32. Therefore, a description thereof will be omitted to avoid redundancy.

Figure 6:
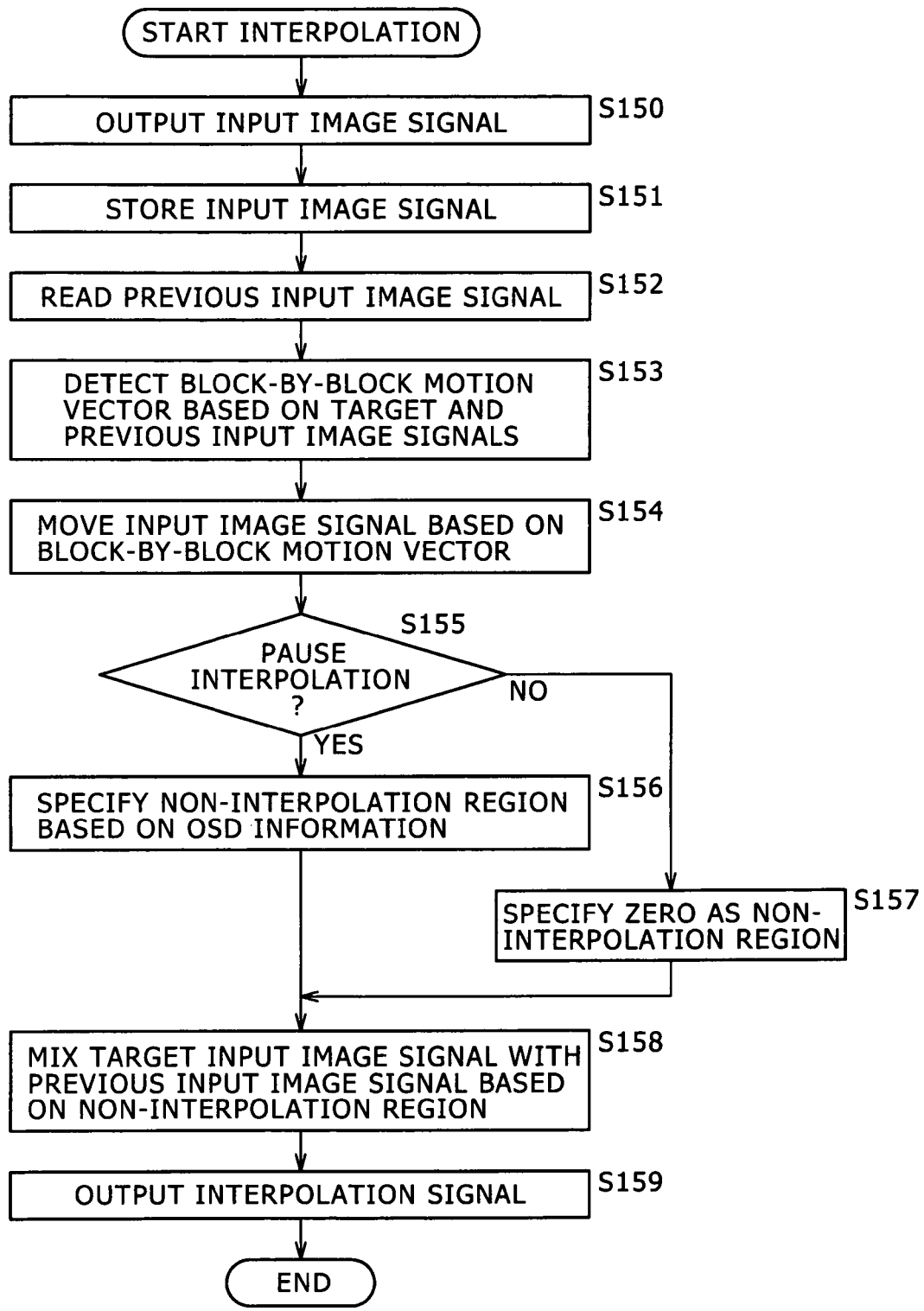
FIG. 6 is a flowchart describing interpolation performed by the interpolation section shown in FIG. 3.

The interpolation performed by the interpolation section 72 shown in FIG. 3 will be described next with reference to FIG. 6. This interpolation is initiated, for example, when an input image signal is fed to the interpolation section 72.

In step S150, the selection section 86 of the interpolation section 72 outputs the input image signal from the OSD superimposition section 71 as an interpolated image signal. In step S151, the frame memory 81 stores the input image signal from the OSD superimposition section 71. In step S152, the frame memory 81 reads the stored previous input image signal and supplies the signal to the detection section 82, moving section 83 and mixing section 85.

In step S153, the detection section 82 treats the input image signal from the OSD superimposition section 71 as the target input image signal. The same section 82 detects the block-by-block motion vector of the target input image signal based on the target input image signal and the previous input image signal from the frame memory 81.

In step S154, the moving section 83 moves the previous input image signal from the frame memory 81 on a block-by-block basis based on the block-by-block motion vector from the detection section 82. The same section 83 supplies the moved previous input image signal to the mixing section 85.

In step S155, the specification section 84 determines whether to pause the interpolation, that is, whether the MPU 31 has already transmitted an interpolation pause instruction but has yet to transmit an interpolation restart instruction.

If determining in step S155 that the interpolation will be paused, the specification section 84 specifies, in step S156, a non-interpolation region based on the OSD information from the MPU 31 and supplies that region to the mixing section 85.

On the other hand, if the specification section 84 determines in step S155 that the interpolation will not be paused, that is, if the MPU 31 has yet to transmit any interpolation pause instruction or if the MPU 31 has already transmitted an interpolation restart instruction but has yet to transmit an interpolation pause instruction, then the specification section 84 specifies zero in step S157 to indicate that there is no non-interpolation region. Then, the specification section 84 supplies the non-interpolation region to the mixing section 85.

In step S158, the mixing section 85 mixes the target input image signal from the OSD superimposition section 71 with the moved previous input image signal from the moving section 83 based on the non-interpolation region from the specification section 84 to generate an interpolation signal. Then, the mixing section 85 supplies the interpolation signal to the selection section 86. In step S159, the selection section 86 outputs the interpolation signal from the mixing section 85 as the interpolated image signal to terminate the processes.

In the receiving device 11 shown in FIG. 1, the interpolation section 72 specifies a non-interpolation region based on OSD information. However, the same section 72 may specify not only a non-interpolation region but also a non-detection region of the input image signal block in which no motion vector is detected by the detection section 82.

Figure 7:
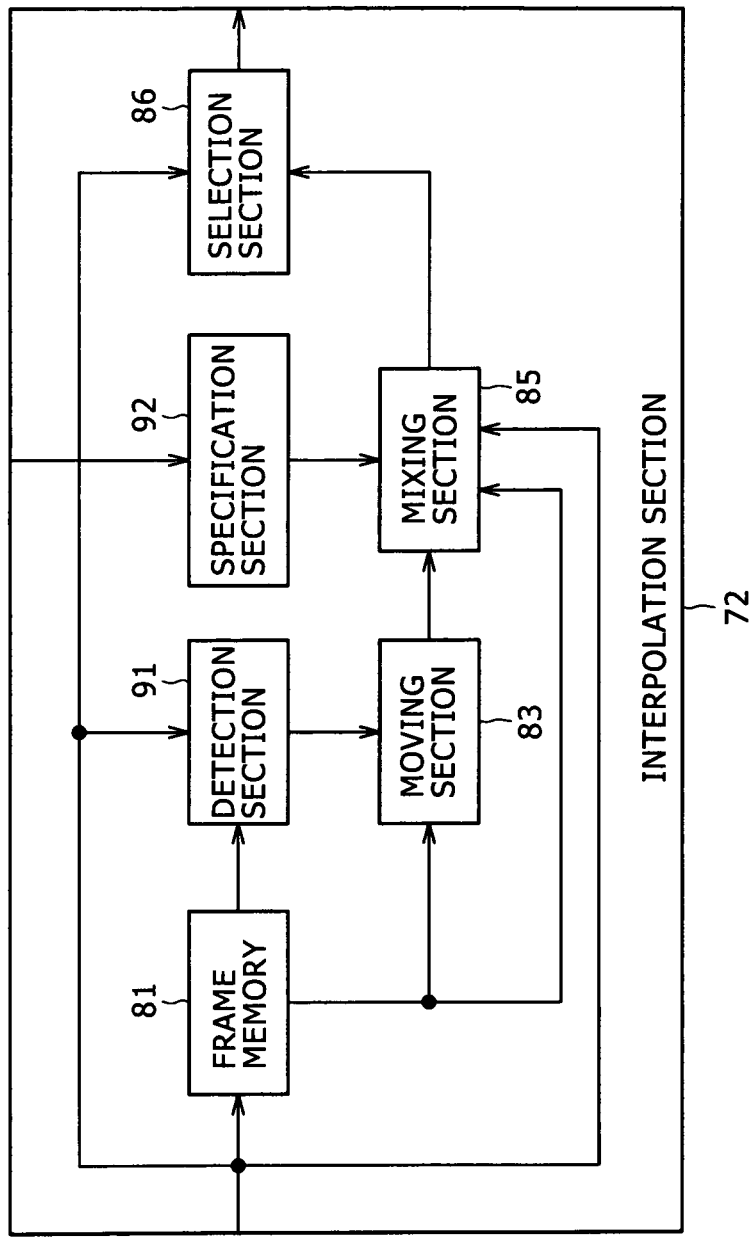
FIG. 7 is a block diagram illustrating another detailed configuration example of the interpolation section shown in FIG. 2.

In this case, the interpolation section 72 in FIG. 2 is configured as shown in FIG. 7. The interpolation section 72 in FIG. 7 includes the frame memory 81, moving section 83, mixing section 85, selection section 86, a detection section 91 and specification section 92. It should be noted that the same components as those in FIG. 3 are denoted by the same reference symbols. A description thereof will be omitted to avoid redundancy.

The detection section 91 treats the input image signal from the OSD superimposition section 71 as the target input image signal. The same section 91 detects the motion vector of the target input image signal on a block-by-block basis based on the target input image signal and the previous input image signal immediately preceding the target input image signal from the frame memory 81. The detection section 91 supplies the detected motion vector to the moving section 83.

The specification section 92 specifies at least one non-interpolation region and one non-detection region based on the non-interpolation instruction and OSD information from the MPU 31. The specification section 92 specifies zero as the non-interpolation and non-detection regions in response to an interpolation restart instruction from the MPU 31 to indicate that there is no non-interpolation or non-detection region. The specification section 92 supplies the non-interpolation region to the mixing section 85 and the non-detection section to the detection section 91.

As described above, the interpolation section 72 in FIG. 7 detects a motion vector of a target input image on a block-by-block basis in regions other than an OSD-information-based non-detection region based on a target input image signal and its previous input image signal. This provides further improved image quality of the interpolated image signal.

That is, we assume that a motion vector is detected when an OSD image is displayed or undisplayed using a target input image signal superimposed with the OSD image signal, another not superimposed therewith and their previous input image signal. In this case, the motion vector detected in a block superimposed with the OSD image is generally large and irrelevant to the background image other than the OSD image. Therefore, the interpolation section 72 in FIG. 7 detects a motion vector on a block-by-block basis only in regions other than the non-detection region based on the OSD information. This prevents detection of an abnormal motion vector in blocks superimposed with the OSD image signal, thus providing improved image quality of the interpolated image signal which is generated by using the motion vector.

Figure 8:
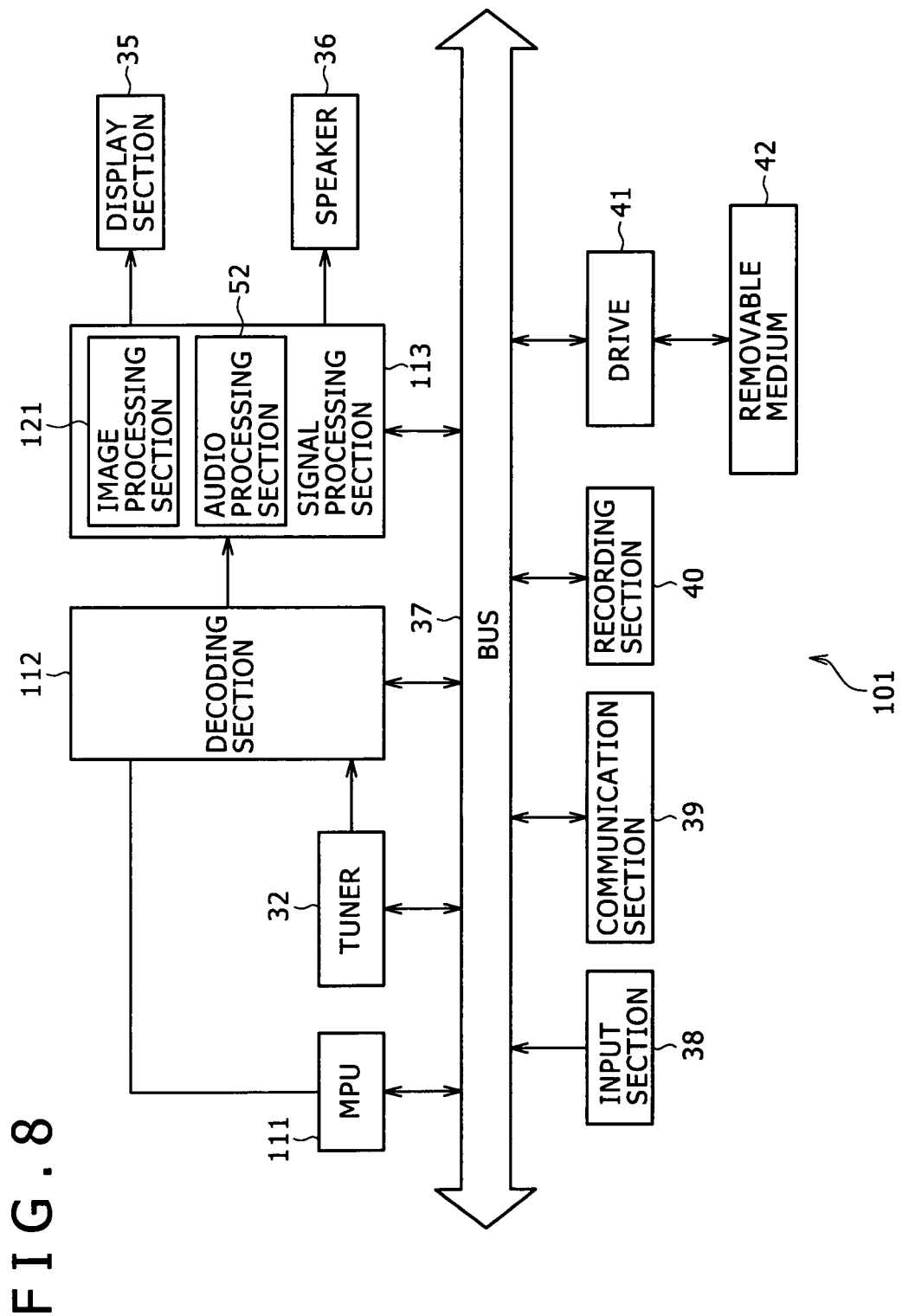
FIG. 8 is a block diagram illustrating a second embodiment of a receiving device to which the present invention is applied.

FIG. 8 illustrates a configuration example of a second embodiment of a receiving device to which the present invention is applied.

In a receiving device 101 shown in FIG. 8, the internal components thereof are connected to each other via the bus 37, namely, the tuner 32, input section 38, communication section 39, recording section 40, drive 41, an MPU 111, decoding section 112, and signal processing section 113 having the display section 35 and speaker 36 connected thereto. The decoding section 112 handles the superimposition. It should be noted that the same components as those in FIG. 1 are denoted by the same reference symbols. A description thereof will be omitted to avoid redundancy.

The ports of the MPU 111 are connected to those of the decoding section 112. The MPU 111 controls the ports to communicate with the decoding section 112. The MPU 111 executes the programs installed in the recording section 40, for example, to perform various processes in response to the instructions from the input section 38. For instance, the MPU 111 supplies OSD information and an interpolation pause or restart instruction to an image processing section 121 of the signal processing section 113 via the bus 37 according to the status of the ports of the decoding section 112.

Further, as with the MPU 31 shown in FIG. 1, the MPU 111 controls the tuner 32, decoding section 112 and signal processing section 113 in response to an instruction from the input section 38 adapted to display the program of the user's desired channel. By controlling these components, the MPU 111 causes the display section 35 to display the image associated with the program signal of the channel. At the same time, the MPU 111 causes the speaker 36 to produce an audio output.

Still further, the MPU 111 installs the programs to the recording section 40 as necessary as with the MPU 31. These programs include those downloaded from the communication section 39 and others recorded in the removable medium 42 loaded in the drive 41.

The decoding section 112 decodes the program signal from the tuner 32 into a predetermined format such as MPEG2 as with the decoding section 33 shown in FIG. 1. Further, the same section 112 controls the ports in response to an OSD display or undisplay instruction from the input section 38. By controlling the ports, the same section 112 changes the status of the ports into a status representing OSD information and an interpolation pause instruction or an interpolation restart instruction. Then, the same section 112 superimposes the OSD image signal on the input image signal which is the image signal of the decoded program signal. The same section 112 supplies the resultant signal to the image processing section 121.

As described above, the decoding section 112 changes the status of its ports to transmit OSD information and an interpolation pause instruction or an interpolation restart instruction. This eliminates the need to confirm the completion of transmission. Therefore, the same section 112 can immediately initiate the superimposition of the OSD image signal after transmitting OSD information and an interpolation pause instruction, which is not possible with the transmission via the bus 37 which requires the confirmation of transmission. This provides faster response in the display of the OSD image.

The signal processing section 113 includes the audio processing section 52 and image processing section 121. The image processing section 121 performs various types of image processing on the input image signal from the decoding section 112. Such image processing includes interpolation of the continuous image signal at an intermediate time and D/A conversion. The same section 121 supplies the analog image signal obtained from the image processing to the display section 35 to display the image on the same section 35.

The interpolation performed by the receiving device 101 shown in FIG. 8 will be described next with reference to FIG. 9.

Figure 9:
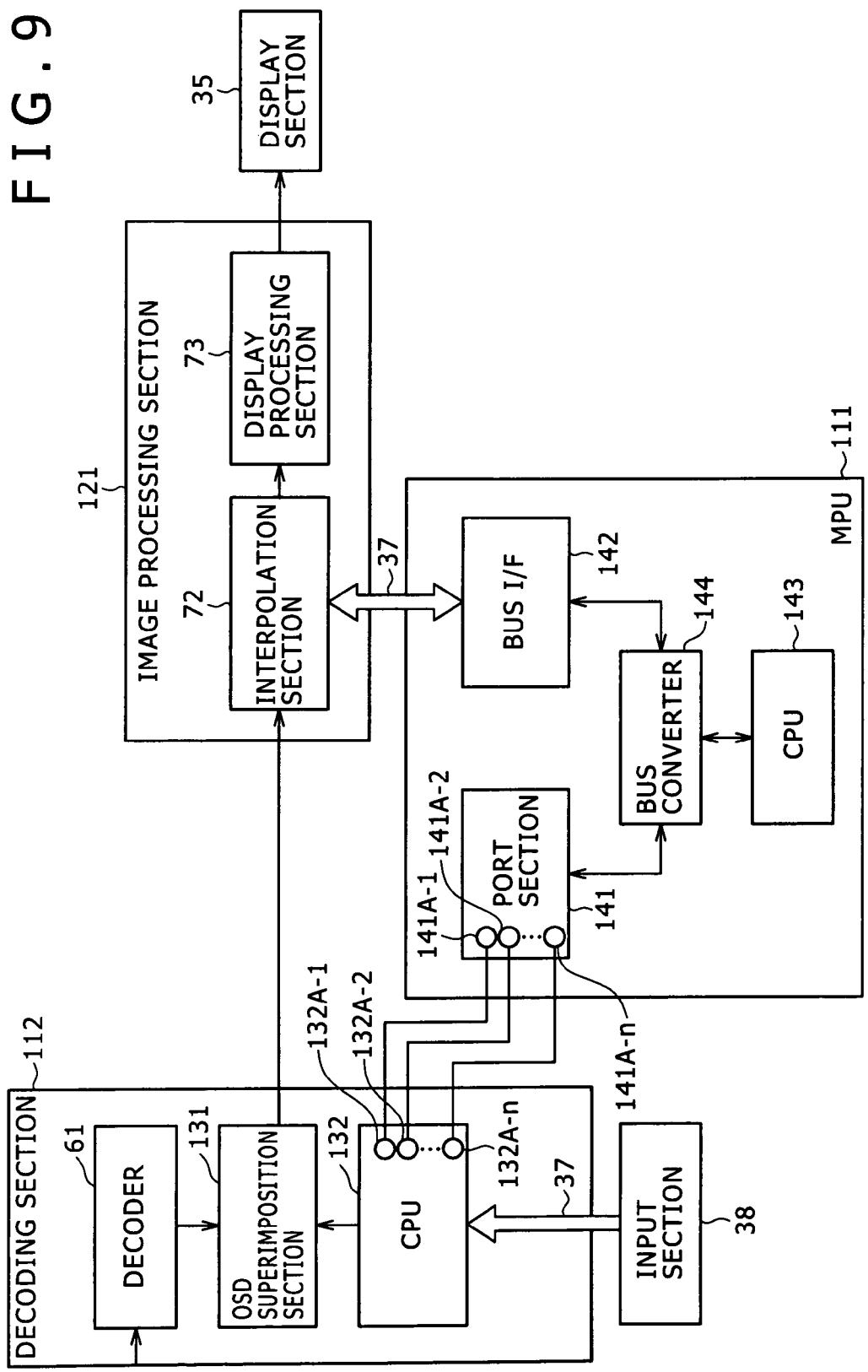
FIG. 9 is a block diagram describing interpolation performed by the receiving device shown in FIG. 8.

It should be noted that the same components in FIG. 9 as those in FIG. 2 are denoted by the same reference symbols. A description thereof will be omitted to avoid redundancy.

As illustrated in FIG. 9, in response to a user instruction to start or terminate the display of the OSD image, the input section 38 supplies an OSD display instruction and OSD information or an OSD undisplay instruction to the decoding section 112 via the bus 37.

The decoding section 112 includes the decoder 61, an OSD superimposition section 131 and a CPU (Central Processing Unit) 132. The OSD superimposition section 131 stores the OSD image signal. The same section 131 superimposes the OSD image signal stored in advance on the input image signal from the decoder 61 in response to a superimposition start instruction from the CPU 132. The same section 131 supplies the superimposed input image signal to the interpolation section 72 of the image processing section 121. Further, in response to a superimposition pause instruction from the CPU 132, the same section 131 pauses the superimposition of the OSD image signal on the input image signal from the decoder 61. In this case, the same section 131 supplies the input image signal from the decoder 61 to the interpolation section 72 in an as-is form.

The CPU 132 has n ports 132A-1 to 132A-n (n: an integer equal to 1 or greater) which are connected respectively to n ports 141A-1 to 141A-n of the MPU 111 (which will be described later). The port 132A-1 is adapted to transmit an interpolation pause instruction. The port 132A-2 is adapted to transmit an, interpolation restart instruction. The ports 132A-3 to 132A-n are adapted to transmit OSD information.

The CPU 132 controls the ports 132A-1 to 132A-n in response to an OSD display instruction and OSD information transmitted from the input section 38 via the bus 37. The CPU 132 puts the port 132A-1 into a status representing an interpolation pause instruction and the ports 132A-3 to 132A-n into a status representing OSD information. Then, the CPU 132 supplies a superimposition start instruction to the OSD superimposition section 131. Further, the CPU 132 controls the port 132A-2 in response to an OSD undisplay instruction from the input section 38. The CPU 132 puts the port 132A-2 into a status representing an interpolation restart instruction. Then, the CPU 132 supplies a superimposition pause instruction to the OSD superimposition section 131.

In the MPU 111 shown in FIG. 9, the internal components thereof are connected to each other via a bus converter 144, namely, a port section 141 having the ports 141A-1 to 141A-n, bus I/F (interface) 142 and CPU 143. The port section 141 confirms, under control of the CPU 143, the status of the ports 141A-1 to 141A-n which are connected respectively to the ports 132A-1 to 132A-n of the CPU 132. The same section 141 supplies a signal representing the status of the ports 141A-1 to 141A-n to the CPU 143 via the bus converter 144 as a status signal representing the status of the ports 132A-1 to 132A-n.

The bus I/F 142 communicates with the image processing section 121 via the bus 37. For example, the bus I/F 142 transmits an interpolation pause instruction and OSD information or an interpolation restart instruction supplied from the CPU 143 via the bus converter 144 to the interpolation section 72 of the image processing section 121 via the bus 37.

The CPU 143 controls the port section 141 and bus I/F 142 according to a predetermined program. For example, the CPU 143 transmits a control signal adapted to confirm the status of the ports 141A-1 to 141A-n of the port section 141. This control signal is transmitted at predetermined intervals to the port section 141 via the bus converter 144 for polling. Further, the CPU 143 supplies an interpolation pause instruction and OSD information or an interpolation restart instruction to the bus I/F 142 via the bus converter 144. The CPU 143 does so in response to a status signal transmitted from the port section 141 via the bus converter 144 as a result of the polling.

The bus converter 144 is connected to the port section 141, bus I/F 142 and CPU 143 via a bus to control the communication therebetween via the bus.

The image processing section 121 includes the interpolation section 72 and display processing section 73. The interpolation section 72 interpolates the input image signal from the OSD superimposition section 131 of the decoding section 112 in response to an interpolation pause instruction and OSD information or an interpolation restart instruction transmitted from the bus I/F 142 of the MPU 111 via the bus 37. The same section 72 supplies the interpolated image signal to the display processing section 73. As in the case of FIG. 2, the display processing section 73 displays an image on the display section 35 based on the interpolated image signal from the interpolation section 72.

A description will be given next of the timings at which interpolation pause and restart instructions are transmitted with reference to FIGS. 10A and 10B. It should be noted that the horizontal axis in FIGS. 10A and 10B represents time.

Figure 10:
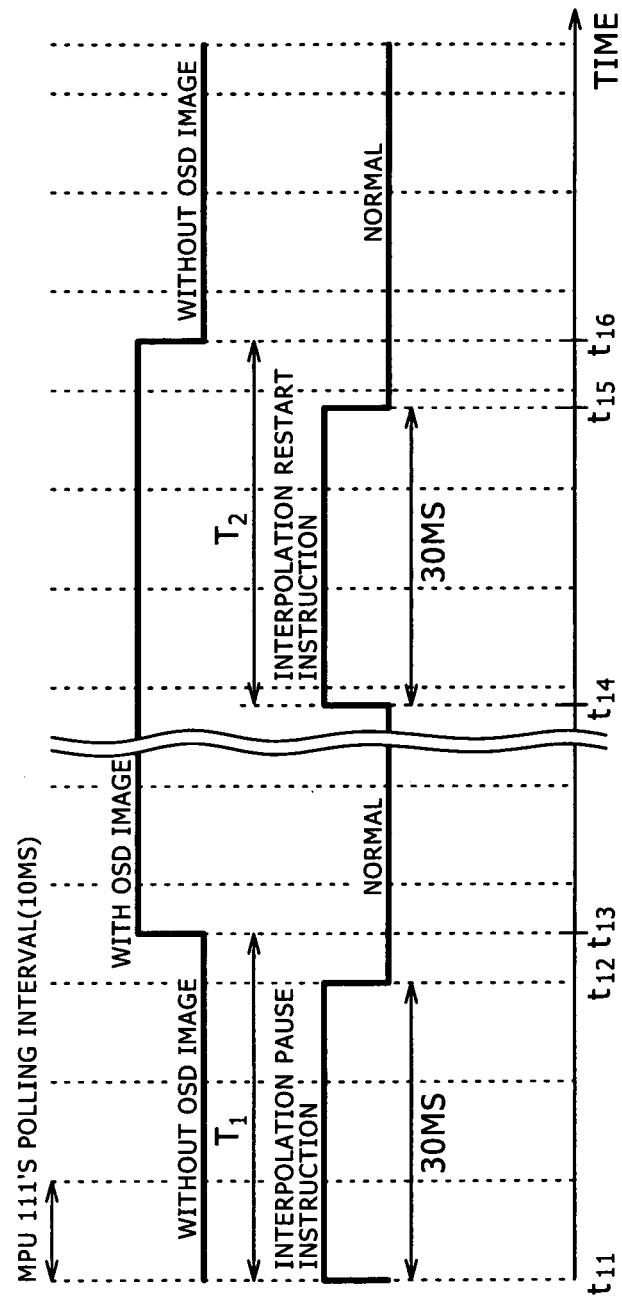
FIGS. 10A and 10B are timing diagrams describing timings at which interpolation pause and restart instructions are transmitted.

Also, we assume that the CPU 143 of the MPU 111 polls the ports every 10 ms in the case of FIGS. 10A and 10B. In this case, in order for the port section 141 to confirm the status of the ports 132A-1 to 132A-n, the status thereof must be maintained for at least 20 ms. In the case of FIGS. 10A and 10B, therefore, the CPU 132 maintains the status of the ports 132A-1 to 132A-n for a period of 30 ms in consideration of the time required, for example, for interrupt handling. However, the time during which the status is maintained is not limited to 30 ms so long as it is long enough (20 ms or more in the case of FIGS. 10A and 10B) for the port section 141 to confirm the status of the ports 132A-1 to 132A-n.

When an OSD display instruction and OSD information are supplied to the CPU 132 from the input section 38 at time $t_{11}$ in FIGS. 10A and 10B, the CPU 132 puts the port 132A-1 into a status representing an interpolation pause instruction for a period of time from time $t_{11}$ to time $t_{12}$ which is 30 ms later than time $t_{11}$, as illustrated in FIG. 10B. Also during this period, the CPU 132 puts the ports 132A-3 to 132A-n into a status representing OSD information. Then, the MPU 111 polls the ports every 10 ms to recognize the interpolation pause instruction and OSD information and supplies the instruction and information to the interpolation section 72. This causes the interpolation based on a motion vector to be paused in the non-interpolation region specified based on the OSD information.

Later at time $t_{13}$, the CPU 132 supplies a superimposition start instruction to the OSD superimposition section 131. The same section 131 initiates the superimposition of the OSD image signal in response to the instruction, as illustrated in FIG. 10A. As a result, the OSD image is displayed on the display section 35. It should be noted that a duration $T_1$ from time $t_{11}$ to time $t_{13}$ is a period of time equal to or longer than the time required for the MPU 111 to recognize an interpolation pause instruction by polling and supply the instruction to the interpolation section 72.

As described above, in the receiving device 101, the MPU 111 supplies an interpolation pause instruction to the interpolation section 72 before time $t_{13}$ when the superimposition begins. In response to the instruction, the interpolation section 72 pauses the interpolation based on a motion vector in the non-interpolation region, thus providing improved image quality of the interpolated image signal.

Next, when an OSD undisplay instruction is supplied to the CPU 132 from the input section 38 at time $t_{14}$, the CPU 132 puts the port 132A-2 into a status representing an interpolation restart instruction for a period of time from time $t_{14}$ to time $t_{15}$ which is 30 ms later than time $t_{14}$, as illustrated in FIG. 10B. Then, the MPU 111 polls the ports every 10 ms to recognize the interpolation restart instruction and supplies the instruction to the interpolation section 72. This causes the interpolation based on a motion vector to be initiated in all regions.

Later at time $t_{16}$, the CPU 132 supplies a superimposition pause instruction to the OSD superimposition section 131. The same section 131 pauses the superimposition of the OSD image signal in response to the instruction, as illustrated in FIG. 10A. As a result, the OSD image disappears from the display section 35. It should be noted that a duration $T_2$ from time $t_{14}$ to time $t_{16}$ is a period of time equal to or longer than the time required for the MPU 111 to recognize an interpolation restart instruction by polling and supply the instruction to the interpolation section 72.

In the example shown in FIGS. 10A and 10B, the superimposition of the OSD image is paused after an interpolation pause instruction has been supplied to the interpolation section 72. However, an interpolation pause instruction may be supplied to the interpolation section 72 after the superimposition of the OSD image signal has been paused.

Figure 11:
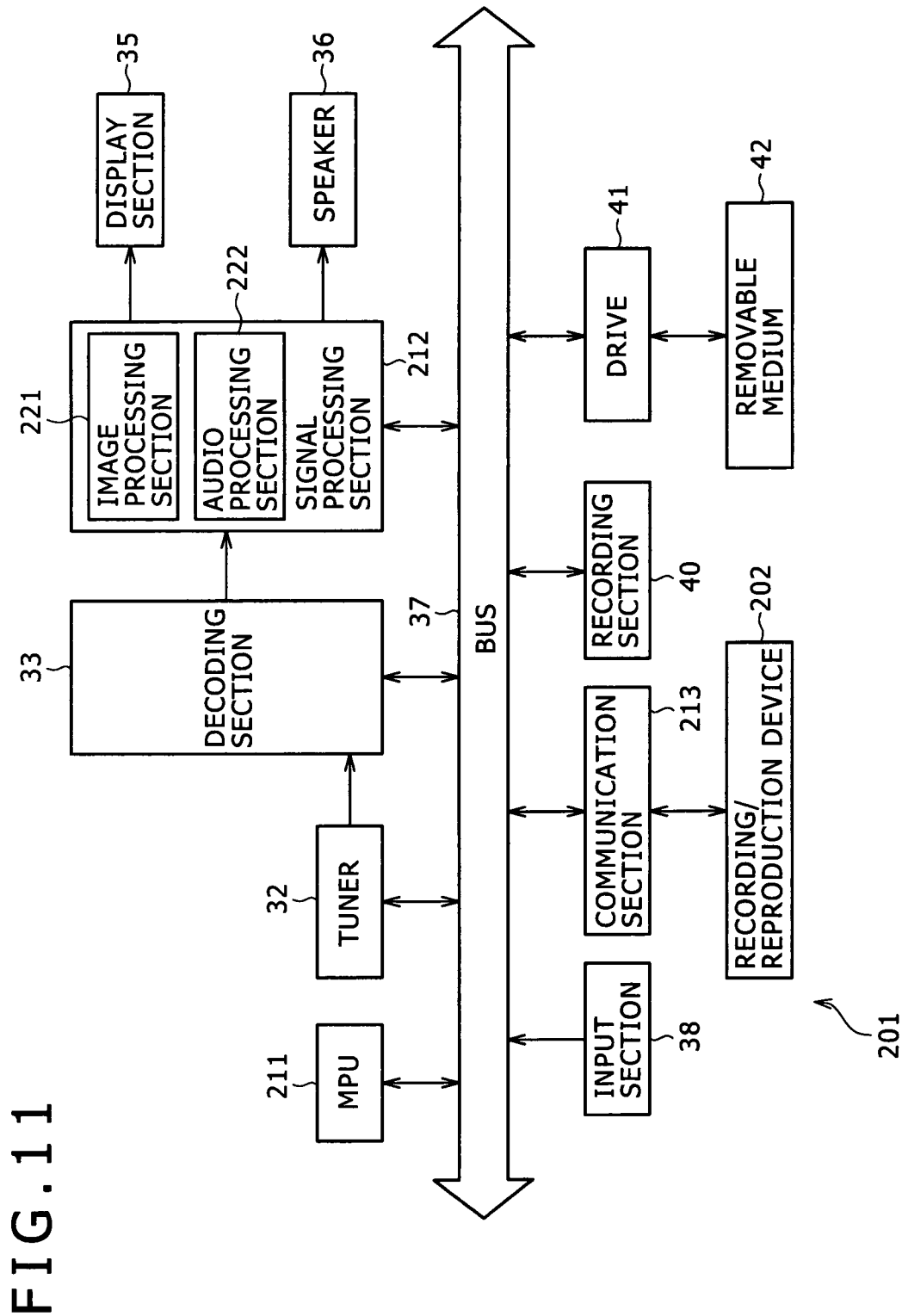
FIG. 11 is a block diagram illustrating a configuration example of a third embodiment of a receiving device to which the present invention is applied.

FIG. 11 illustrates a configuration example of a third embodiment of a receiving device to which the present invention is applied.

In a receiving device 201 shown in FIG. 11, the internal components thereof are connected to each other via the bus 37, namely, the tuner 32, decoding section 33, input section 38, recording section 40, drive 41, an MPU 211, and signal processing section 212 having the display section 35 and speaker 36 connected thereto. An external recording/reproduction device 202 handles the superimposition. The same device 202 is connected to the receiving device 201 via a connection cable (not shown). It should be noted that the same components as those in FIG. 1 or FIG. 8 are denoted by the same reference symbols. A description thereof will be omitted to avoid redundancy.

The MPU 211 executes the programs installed in the recording section 40, for example, to perform various processes in response to the instructions from the input section 38. For instance, in response to an instruction from the input section 38 adapted to display the program of the user's desired channel, the MPU 211 controls the tuner 32, decoding section 33 and signal processing section 212 as with the MPU 31 shown in FIG. 1. By controlling these components, the MPU 211 causes the display section 35 to display the image associated with the program signal of the channel. At the same time, the MPU 211 causes the speaker 36 to produce an audio output.

Further, the MPU 211 supplies an interpolation pause instruction and OSD information to an image processing section 221 based on an OSD display instruction and OSD information from a communication section 213. Still further, the MPU 211 supplies an interpolation restart instruction to the image processing section 221 in response to an OSD undisplay instruction from the communication section 213. Still further, the MPU 211 installs the programs to the recording section 40 as necessary as with the MPU 31. These programs include those downloaded from the communication section 213 and others recorded in the removable medium 42 loaded in the drive 41.

The signal processing section 212 includes the image processing section 221 and an audio processing section 222. The image processing section 221 performs various types of image processing on the image signal of the program signal from the decoding section 33 (hereinafter referred to as the "received image signal"). Such image processing includes interpolation of the continuous image signal at an intermediate time and D/A conversion. The same section 221 supplies the analog image signal obtained from the image processing to the display section 35 to display the image on the same section 35.

The audio processing section 222 performs D/A conversion or other processing on the audio signal of the program signal from the decoding section 33 or communication section 213. The same section 222 supplies the analog audio signal obtained from the processing to the speaker 36 to output the audio externally.

The communication section 213 is connected to the external recording/reproduction device 202 via a connection cable (not shown) for communication with the same device 202. For example, the communication section 213 receives an OSD display instruction and OSD information or an OSD undisplay instruction from the recording/reproduction device 202. The same section 213 supplies the OSD display instruction and OSD information or OSD undisplay instruction to the MPU 211 via the bus 37. Further, the same section 213 receives the program signal from the recording/reproduction device 202 and supplies the signal to the signal processing section 212. Still further, the same section 213 exchanges various types of data with external equipment via an unshown network such as the Internet, as with the communication section 39 shown in FIGS. 1 and 8. For example, the same section 213 downloads a predetermined program from an unshown server via the network and supplies the program to the MPU 211.

The recording/reproduction device 202 includes, for example, a DVD (Digital Versatile Disc) recorder or harddisk recorder. The same device 202 receives a radio wave carrying the program signal of the user's desired program and records the signal to a recording medium such as DVD or harddisk. The same device 202 reproduces the recorded program signal at the instruction of the user and transmits the signal to the communication section 213.

Further, the recording/reproduction device 202 transmits an OSD display instruction and OSD information or an OSD undisplay instruction to the communication section 213 in response to an OSD display or undisplay instruction from the user. After transmitting an OSD display instruction, the same device 202 superimposes the OSD image signal on the image signal of the reproduced program signal and transmits the program signal obtained from the superimposition to the communication section 213.

The interpolation performed by the receiving device 201 shown in FIG. 11 will be described next with reference to FIG. 12.

Figure 12:
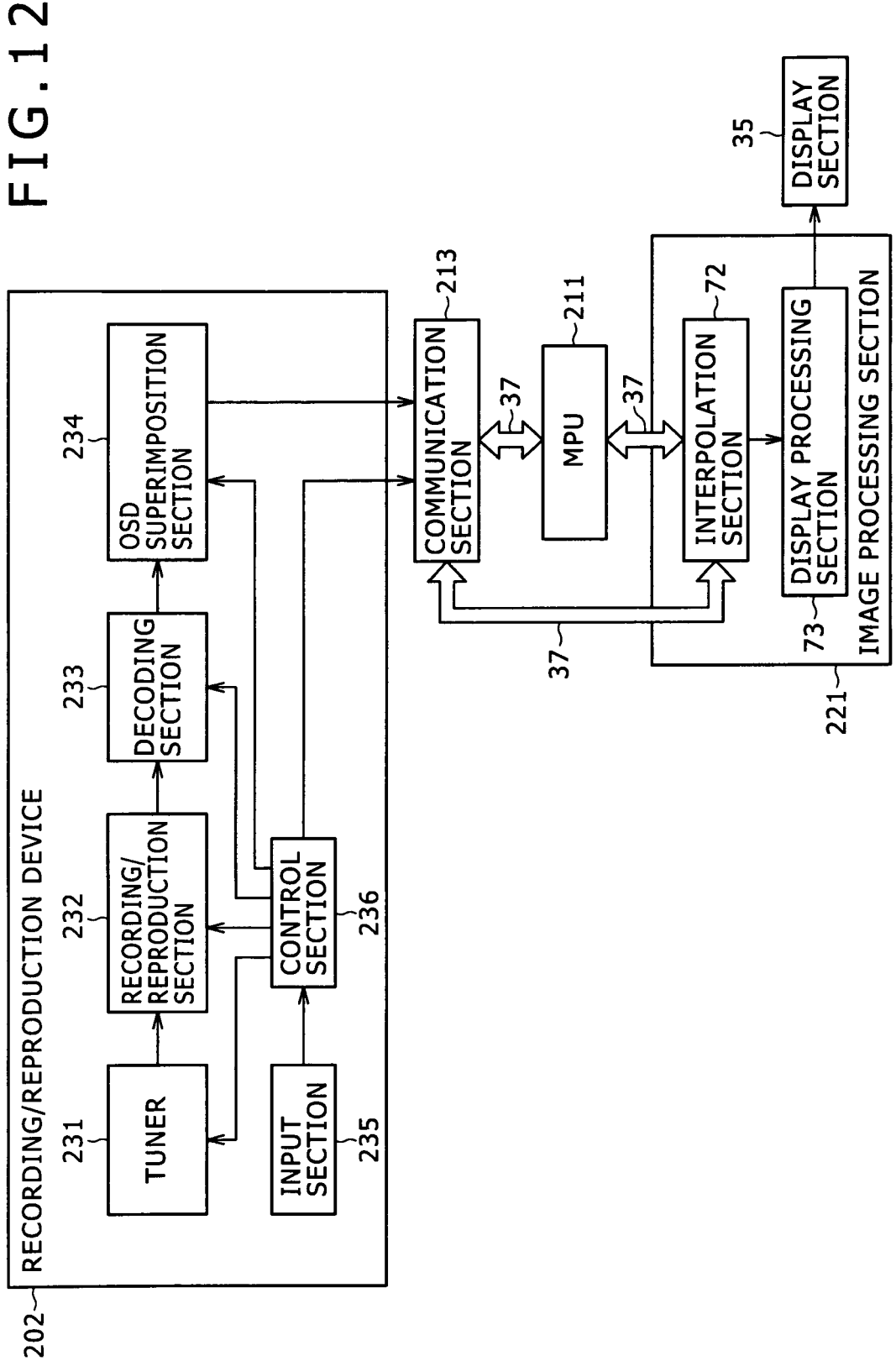
FIG. 12 is a block diagram describing interpolation performed by the receiving device shown in FIG. 11.

It should be noted that the same components in FIG. 12 as those in FIG. 2 or 9 are denoted by the same reference symbols. A description thereof will be omitted to avoid redundancy.

The recording/reproduction device 202 shown in FIG. 12 includes a tuner 231, recording/reproduction section 232, decoding section 233, OSD superimposition section 234, input section 235 and control section 236.

The tuner 231 receives a radio wave carrying the program signal from an unshown broadcasting station and demodulates the radio wave under control of the control section 236. The tuner 231 supplies the program signal obtained from the demodulation to the recording/reproduction section 232 for recording.

The recording/reproduction section 232 records the program signal from the tuner 231 to a removable medium loaded therein such as DVD or to a built-in recording medium (not shown) such as harddisk. The same section 232 reads the recorded program signal and supplies the signal to the decoding section 233 under control of the control section 236.

The decoding section 233 decodes the program signal from the recording/reproduction section 232 into a predetermined format under control of the control section 236. The same section 233 supplies the decoded program signal to the OSD superimposition section 234.

The OSD superimposition section 234 superimposes the OSD image signal stored in advance on the image signal from the decoding section 233 at the position based on the OSD information from the control section 236. The same section 234 does so in response to the superimposition start instruction from the control section 236. Then, the same section 234 transmits the program signal obtained from the superimposition to the communication section 213 of the receiving device 201, for example, through communication via a SCART terminal or HDMI (High-Definition Multimedia Interface) communication. The same section 234 transmits the program signal from the decoding section 233 in an as-is form in response to a superimposition pause instruction from the control section 236.

The input section 235 includes, for example, a receiving section adapted to receive instructions from an unshown remote controller, buttons, keyboard, mouse and switches so as to accept user instructions. In response to a user instruction, the same section 235 supplies various instructions to the control section 236.

In response to a user instruction to record or reproduce the program of the desired channel, for example, the input section 235 supplies an instruction to record or reproduce the program to the control section 236. Further, in response to a user instruction to start or terminate the display of the OSD image, the input section 235 supplies an OSD display instruction and OSD information or an OSD undisplay instruction to the control section 236.

The control section 236 performs various processes in response to instructions from the input section 235. For example, the control section 236 controls the tuner 231 in response to an instruction from the input section 235 to record the program of the user's desired channel. By doing so, the same section 236 causes the recording/reproduction section 232 to record the program signal of the program. Further, the control section 236 controls the recording/reproduction section 232 and decoding section 233 in response to an instruction from the input section 235 to reproduce the program of the user's desired channel. By doing so, the same section 236 causes the recording/reproduction section 232 to reproduce the program signal of the program.

Still further, the control section 236 transmits an OSD display instruction and OSD information to the communication section 213 in response to an OSD display instruction and OSD information from the input section 235. The same section 236 does so through the HDMI's CEC line (Consumer Electronics Control Line) or an AV link defined as EN-50157 by CENELEC (European Committee for Electrotechnical Standardization). Then, the same section 236 transmits a superimposition start instruction and OSD information to the OSD superimposition section 234. Still further, the control section 236 supplies a superimposition pause instruction to the OSD superimposition section 234 in response to an OSD undisplay instruction. Then, the same section 236 transmits an OSD undisplay instruction to the communication section 213 through the HDMI's CEC line or AV link.

The communication section 213 receives an OSD display instruction and OSD information or an OSD undisplay instruction from the control section 236 and supplies the instruction and information or the instruction to the MPU 211 via the bus 37. Further, the same section 213 receives the program signal from the OSD superimposition section 234 and supplies the received image signal of the program signal to the interpolation section 72 of the image processing section 221. It should be noted that the audio signal is supplied to the audio processing section 222 (FIG. 11). The MPU 211 supplies an interpolation pause instruction and OSD information to the interpolation section 72 via the bus 37 in response to an OSD display instruction and OSD information. Further, the MPU 211 supplies an interpolation restart instruction to the interpolation section 72 in response to an OSD undisplay instruction.

As described above, the control section 236 of the recording/reproduction device 202 attached externally to the receiving device 201 transmits OSD information and an OSD display instruction to the receiving device 201 before transmitting a superimposition start instruction. The control section 236 does so to pause the interpolation using a motion vector in the non-interpolation region based on the OSD information. This allows the receiving device 201 to provide improved image quality of the interpolated image signal even if the OSD image signal is superimposed by the external recording/reproduction device 202.

Figure 13:
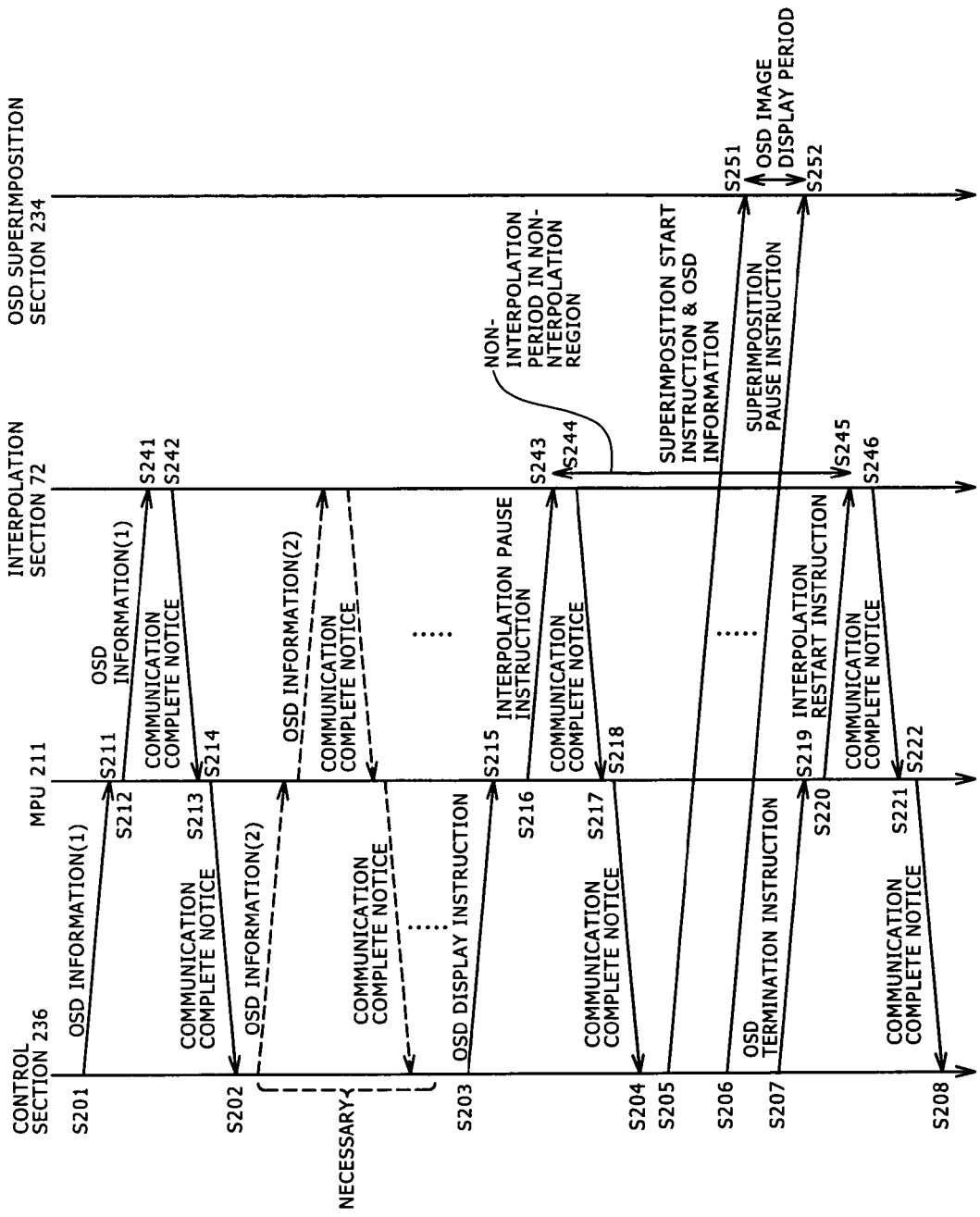
FIG. 13 is a flowchart describing OSD superimposition performed by the receiving device shown in FIG. 11.

The OSD superimposition by the receiving device 201 and recording/reproduction device 202 shown in FIG. 11 will be described next with reference to FIG. 13. The OSD superimposition is initiated, for example, when an OSD display instruction and OSD information are supplied to the control section 236 from the input section 235.

In step S201, the control section 236 obtains an OSD display instruction and at least one piece of OSD information from the input section 235. The same section 236 transmits the piece of OSD information to the MPU 211 via the communication section 213 of the receiving device 201.

In step S211, the MPU 211 receives OSD information from the control section 236. In step S212, the MPU 211 transmits the OSD information to the interpolation section 72 via the bus 37. In step S241, the interpolation section 72 receives the OSD information from the MPU 211. In step S242, the same section 72 transmits a notice to the MPU 211 to the effect that the communication of the OSD information is complete.

In step S213, the MPU 211 receives the communication complete notice from the interpolation section 72. In step S214, the MPU 211 transmits a notice to the control section 236 to the effect that the communication of the OSD information is complete. In step S202, the control section 236 receives the communication complete notice from the MPU 211.

From here onward, the processes in steps S201 and S202, in steps S211 to S214 and in steps S241 and S242 will be similarly repeated as many times as the number of pieces of the OSD information supplied to the control section 236 from the input section 235.

Then, in step S203, the control section 236 transmits an OSD display instruction to the MPU 211. In step S215, the MPU 211 receives the OSD display instruction. In step S216, the MPU 211 transmits an interpolation pause instruction to the interpolation section 72 in response to the OSD display instruction received in step S215. In step S243, the interpolation section 72 receives the interpolation pause instruction. Then, the same section 72 initiates, in response to the interpolation pause instruction, the pausing of the interpolation using a motion vector in the non-interpolation region. In step S244, the same section 72 transmits a notice to the MPU 211 to the effect that the communication of the interpolation pause instruction is complete. In step S217, the MPU 211 receives the notice.

In step S218, the MPU transmits a notice to the control section 236 to the effect that the communication of the OSD display instruction is complete. In step S204, the control section 236 receives the notice. In step S205, the same section 236 transmits a superimposition start instruction and all the OSD information obtained from the input section 235 to the OSD superimposition section 234. In step S251, the OSD superimposition section 234 receives the superimposition start instruction and OSD information from the MPU 31. The same section 234 superimposes, in response to the OSD start instruction, the OSD image signal on the input image signal from the decoder 233 at the position based on the OSD information. As a result, the OSD image is displayed on the display section 35.

From here onward, the processes in steps S201 to S205, in steps S211 to S218, in steps S241 to S244 and in step S251 will be repeated until an OSD undisplay instruction is supplied to the control section 236 from the input section 235. These processes will be repeated each time an OSD display instruction is supplied to the control section 236 from the input section 235.

In step S206, the control section 236 obtains an OSD undisplay instruction from the input section 235. The same section 236 transmits a superimposition pause instruction to the OSD superimposition section 234 in response to the OSD undisplay instruction. In step S252, the OSD superimposition section 234 receives the superimposition pause instruction from the control section 236. The same section 234 pauses the superimposition of the OSD image signal on the input image signal in response to the superimposition pause instruction. As a result, the OSD image appears on the display section 35 from the completion of step S251 by the OSD superimposition section 234 to the completion of step S252 by the same section 234.

In step S207, the control section 236 transmits an OSD undisplay instruction to the MPU 211. In step S219, the MPU 211 receives the OSD undisplay instruction. In step S220, the MPU 211 transmits an interpolation restart instruction to the interpolation section 72 in response to the OSD undisplay instruction received in step S219. In step S245, the interpolation section 72 receives the interpolation restart instruction. The same section 72 initiates the interpolation using a motion vector for all regions. As a result, the interpolation using a motion vector is paused in the non-interpolation region from the completion of step S243 to the completion of step S245.

In step S246, the interpolation section 72 transmits a notice to the MPU 211 to the effect that the communication of the interpolation restart instruction is complete. In step S221, the MPU 211 receives the notice. In step S222, the MPU 211 transmits a notice to the control section 236 to the effect that the communication of the OSD undisplay instruction is complete. In step S208, the control section 236 receives the notice.

In the above description, the continuous image signal is interpolated at an intermediate time. However, the image signal need not necessarily be interpolated at an intermediate time. Instead, the image signal may be interpolated at an arbitrary time.

Further, if OSD information is already fixed for the OSD image signal which can be superimposed, the OSD information may be stored in advance in the OSD superimposition section 71 (131, 234) so that the input section 38 (235) transmits information identifying the OSD information (e.g., number). In this case, a smaller amount of information needs to be transmitted than when OSD information is transmitted. This ensures speedy transmission, thus providing improved response.

Still further, in the above description, the superimposition of all the OSD images is paused in a single step. However, the superposition of the OSD images may be paused on an individual basis. In this case, OSD information of the OSD image whose superimposition is to be paused is transmitted together with a superposition pause instruction or interpolation restart instruction. Then, a new non-interpolation region is specified based on the OSD information to pause the superimposition of the target OSD image.

It is to be noted that, in the present specification, the step of describing the program to be stored in the program recording medium includes not only those processes executed in a time series manner according to the order given but also others that are not necessarily executed in a time series manner but executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
    detection means for detecting a motion vector of an input image signal which is an input time-series image signal;
    interpolation means for interpolating, based on the motion vector, a signal between input image signals which is an image signal at an arbitrary time between the input image signal and a previous input image signal immediately preceding the input image signal, the interpolation means for further outputting an interpolated signal;
    acquisition means for acquiring a predetermined image signal to be superimposed on the input image signal and information indicating the position, in the input image signal, where the predetermined image signal is to be superimposed;
    specification means for specifying, based on the information indicating the position where the predetermined image signal is to be superimposed, at least one corresponding non-interpolation region of the signal between input image signals in which the interpolation is not performed,
    wherein the interpolation means interpolates, based on the specified non-interpolation region, the signal between input image signals in regions other than the non-interpolation region and outputs an interpolated signal; and
    superimposition means for superimposing the predetermined image signal on the input image signal,
    wherein the acquisition means is connected to the interpolation means and the superimposition means via a bus, and
    (i) the acquisition means first transmits an interpolation pause instruction to the interpolation means via the bus and then transmits a superimposition start instruction to the superimposition means via the bus, or
    (ii) the acquisition means first transmits the superimposition start instruction to the superimposition means via the bus and then transmits the interpolation pause instruction to the interpolation means via the bus, and the superimposition means then delays starting the superimposing of the predetermined image signal on the input image signal until a predetermined period of time elapses.

2. The image processing device of claim 1, wherein the specification means specifies, based on the information indicating the position where the predetermined image signal is to be superimposed, at least one non-detection region of the input image signal in which the motion vector is not detected, and the detection means detects, based on the specified non-detection region, the motion vector of the input image signal in regions other than the non-detection region.

3. The image processing device of claim 1, wherein the acquisition means and the specification means are connected to each other via a bus, upon acquisition of the information indicating the position where the predetermined image signal is to be superimposed, the acquisition means transmits the information indicating the position where the predetermined image signal is to be superimposed to the specification means via the bus before the superimposition begins, and upon reception of the information indicating the position where the predetermined image signal is to be superimposed from the acquisition means, the specification means specifies the non-interpolation region based on the information indicating the position where the predetermined image signal is to be superimposed.

4. The image processing device of claim 1, wherein the information indicating the position where the predetermined image signal is to be superimposed indicates a position, in the input image signal, where an on screen display (OSD) image is to be superimposed on the input image signal.

5. An image processing device, comprising:
    detection means for detecting a motion vector of an input image signal which is an input time-series image signal;
    interpolation means for interpolating, based on the motion vector, a signal between input image signals which is an image signal at an arbitrary time between the input image signal and a previous input image signal immediately preceding the input image signal, the interpolation means for further outputting an interpolated signal;
    acquisition means for acquiring superimposition information which indicates the position, in the input image signal, of a predetermined image signal to be superimposed on the input image signal; and
    specification means for specifying, based on the superimposition information, at least one non-interpolation region of the signal between input image signals in which the interpolation is not performed, wherein the interpolation means interpolates, based on the specified non-interpolation region, the signal between input image signals in regions other than the non-interpolation region and outputs an interpolated signal, and upon acquisition of the superimposition information, the acquisition means put ports into a status representing the superimposition information before the superimposition begins, and the specification means confirm the status of the ports by polling before the superimposition begins so as to specify the non-interpolation region based on the superimposition information if the status of the ports represents the superimposition information.

6. The image processing device of claim 5, wherein the specification means specifies, based on the superimposition information, at least one non-detection region of the input image signal in which the motion vector is not detected, and the detection means detects, based on the specified non-detection region, the motion vector of the input image signal in regions other than the non-detection region.

7. The image processing device of claim 5, further comprising superimposition means for superimposing the predetermined image signal on the input image signal.

8. The image processing device of claim 5, wherein the superimposition information indicates a position, in the input image signal, where an on screen display (OSD) image is to be superimposed on the input image signal.

9. An image processing method for an image processing device for interpolating a signal between input image signals, the signal between input image signals being an image signal at an arbitrary time between an input image signal which is an input time-series image signal and a previous input image signal immediately preceding the input image signal, the image processing method comprising:

detecting a motion vector of the input image signal;

acquiring a predetermined image signal to be superimposed on the input image signal and information indicating the position, in the input image signal, where the predetermined image signal is to be superimposed;

specifying, based on the information indicating the position where the predetermined image signal is to be superimposed, at least one corresponding non-interpolation region of the signal between input image signals in which interpolation based on the motion vector is not performed;

interpolating, based on the motion vector, the signal between input image signals in regions other than the non-interpolation region and outputting an interpolated signal; and superimposing the predetermined image signal on the input image signal, wherein (i) an interpolation pause instruction is first transmitted via a bus to pause the interpolating step, and a superimposition start instruction is then transmitted via the bus to start the superimposing step, or (ii) the superimposition start instruction is first transmitted via the bus, the interpolation pause instruction is transmitted via the bus after the superimposition start instruction is transmitted, and the starting of the superimposing step is then delayed until a predetermined period of time elapses.

10. The image processing method of claim 9, wherein the information indicating the position where the predetermined image signal is to be superimposed indicates a position, in the input image signal, where an on screen display (OSD) image is to be superimposed on the input image signal.

11. A non-transitory computer-readable medium having recorded therein a computer program for performing an image processing method of interpolating a signal between input image signals, the signal between input image signals being an image signal at an arbitrary time between an input image signal which is an input time-series image signal and a previous input image signal immediately preceding the input image signal, the method comprising:

detecting a motion vector of the input image signal;

acquiring a predetermined image signal to be superimposed on the input image signal and information indicating the position, in the input image signal, where the predetermined image signal is to be superimposed;

specifying, based on the information indicating the position where the predetermined image signal is to be superimposed, at least one corresponding non-interpolation region of the signal between input image signals in which interpolation based on the motion vector is not performed;

interpolating, based on the motion vector, the signal between input image signals in regions other than the non-interpolation region and outputting an interpolated signal; and superimposing the predetermined image signal on the input image signal, wherein (i) an interpolation pause instruction is first transmitted via a bus to pause the interpolating step, and a superimposition start instruction is then transmitted via the bus to start the superimposing step, or (ii) the superimposition start instruction is first transmitted via the bus, the interpolation pause instruction is transmitted via the bus after the superimposition start instruction is transmitted, and the starting of the superimposing step is then delayed until a predetermined period of time elapses.

12. The non-transitory computer-readable medium of claim 11, wherein the information indicating the position where the predetermined image signal is to be superimposed indicates a position, in the input image signal, where an on screen display (OSD) image is to be superimposed on the input image signal.

13. An image processing device, comprising:

a detection unit configured to detect a motion vector of an input image signal which is an input time-series image signal;

an interpolation unit configured to interpolate, based on the motion vector, a signal between input image signals which is an image signal at an arbitrary time between the input image signal and a previous input image signal immediately preceding the input image signal, the interpolation unit further configured to output an interpolated signal;

an acquisition unit configured to acquire a predetermined image signal to be superimposed on the input image signal and information indicating the position, in the input image signal, where the predetermined image signal is to be superimposed;

a specification unit configured to specify, based on the information indicating the position where the predetermined image signal is to be superimposed, at least one corresponding non-interpolation region of the signal between input image signals in which the interpolation is not performed, wherein the interpolation unit interpolates, based on the specified non-interpolation region, the signal between input image signals in regions other than the non-interpolation region and outputs an interpolated signal; and a superimposition unit configured to superimpose the predetermined image signal on the input image signal, wherein the acquisition unit is connected to the interpolation unit and the superimposition unit via a bus, and (i) the acquisition unit first transmits an interpolation pause instruction to the interpolation unit via the bus and then transmits a superimposition start instruction to the superimposition unit via the bus, or (ii) the acquisition unit first transmits the superimposition start instruction to the superimposition unit via the bus and then transmits the interpolation pause instruction to the interpolation unit via the bus, and the superimposition unit then delays starting the superimposing of the predetermined image signal on the input image signal until a predetermined period of time elapses.

14. The image processing device of claim 13, wherein the information indicating the position where the predetermined image signal is to be superimposed indicates a position, in the input image signal, where an on screen display (OSD) image is to be superimposed on the input image signal.

15. An image processing method for an image processing device for interpolating a signal between input image signals, the signal between input image signals being an image signal at an arbitrary time between an input image signal which is an input time-series image signal and a previous input image signal immediately preceding the input image signal, the image processing method comprising:

detecting a motion vector of the input image signal;

acquiring superimposition information which indicates the position, in the input image signal, of a predetermined image signal to be superimposed on the input image signal;

specifying, based on the superimposition information, at least one non-interpolation region of the signal between input image signals in which interpolation based on the motion vector is not performed; and interpolating, based on the motion vector, the signal between input image signals in regions other than the non-interpolation region and outputting an interpolated signal, and upon acquisition of the superimposition information, ports are put into a status representing the superimposition information before the superimposition begins, and the status of the ports is confirmed by polling before the superimposition begins so as to specify the non-interpolation region based on the superimposition information if the status of the ports represents the superimposition information.

16. A non-transitory computer-readable medium having recorded therein a computer program for performing an image processing method of interpolating a signal between input image signals, the signal between input image signals being an image signal at an arbitrary time between an input image signal which is an input time-series image signal and a previous input image signal immediately preceding the input image signal, the method comprising:

detecting a motion vector of the input image signal;

acquiring superimposition information which indicates the position, in the input image signal, of a predetermined image signal to be superimposed on the input image signal;

specifying, based on the superimposition information, at least one non-interpolation region of the signal between input image signals in which interpolation based on the motion vector is not performed; and interpolating, based on the motion vector, the signal between input image signals in regions other than the non-interpolation region and outputting an interpolated signal, and upon acquisition of the superimposition information, ports are put into a status representing the superimposition information before the superimposition begins, and the status of the ports is confirmed by polling before the superimposition begins so as to specify the non-interpolation region based on the superimposition information if the status of the ports represents the superimposition information.

17. An image processing device, comprising:

a detection unit configured to detect a motion vector of an input image signal which is an input time-series image signal;

an interpolation unit configured to interpolate, based on the motion vector, a signal between input image signals which is an image signal at an arbitrary time between the input image signal and a previous input image signal immediately preceding the input image signal, the interpolation unit further configured to output an interpolated signal;

an acquisition unit configured to acquire superimposition information which indicates the position, in the input image signal, of a predetermined image signal to be superimposed on the input image signal; and a specification unit configured to specify, based on the superimposition information, at least one non-interpolation region of the signal between input image signals in which the interpolation is not performed, wherein the interpolation unit interpolates, based on the specified non-interpolation region, the signal between input image signals in regions other than the non-interpolation region and outputs an interpolated signal, and upon acquisition of the superimposition information, the acquisition unit puts ports into a status representing the superimposition information before the superimposition begins, and the specification unit confirms the status of the ports by polling before the superimposition begins so as to specify the non-interpolation region based on the superimposition information if the status of the ports represents the superimposition information.

18. An image processing device, comprising:

a detection unit configured to detect a motion vector of an input image signal;

an interpolation unit configured to interpolate, based on the motion vector, a signal between input image signals which is an image signal at an arbitrary time between the input image signal and a previous input image signal immediately preceding the input image signal, the interpolation unit further configured to output an interpolated signal;

an acquisition unit configured to acquire superimposition information which indicates the position, in the input image signal, of a predetermined image signal to be superimposed on the input image signal;

a specification unit configured to specify, based on the superimposition information, at least one non-interpolation region of the signal between input image signals in which the interpolation is not performed, wherein the interpolation unit is configured to interpolate, based on the specified non-interpolation region, the signal between input image signals in regions other than the non-interpolation region, and to output an interpolated signal, and the interpolation unit is configured to pause before superimposition of the predetermined image signal on the input image signal is started.

\* \* \* \* \*